(12) United States Patent
Kariyappa et al.

(10) Patent No.: US 9,639,605 B2
(45) Date of Patent: *May 2, 2017

(54) METHODS AND APPARATUS TO GENERATE SIGNATURES REPRESENTATIVE OF MEDIA

(71) Applicant: The Nielsen Company (US), LLC, New York, NY (US)

(72) Inventors: Manjunath Puttappa Kariyappa, Bengalooru (IN); Srinivasa Rao Edara, Bengalooru (IN); Suresh Kumar Kulathumkal Kalayil, Bengalooru (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,703

(22) Filed: Mar. 30, 2016

(65) Prior Publication Data

US 2016/0210356 A1    Jul. 21, 2016

Related U.S. Application Data

(63) Continuation of application No. 14/512,663, filed on Oct. 13, 2014.

(30) Foreign Application Priority Data

Sep. 5, 2014    (IN) ............................ 2545/DEL/2014

(51) Int. Cl.
    *G06F 17/00*      (2006.01)
    *G06F 17/30*      (2006.01)
    *H04H 60/58*      (2008.01)
(52) U.S. Cl.
    CPC ....... *G06F 17/30743* (2013.01); *H04H 60/58* (2013.01); *H04H 2201/90* (2013.01)

(58) Field of Classification Search
    CPC .............. G06F 17/30743; G06F 3/165; H04H 2201/90; H04H 60/58
    (Continued)

(56) References Cited

U.S. PATENT DOCUMENTS 5,930,369 A    7/1999    Cox et al.
5,983,176 A    11/1999   Hoffert et al.
(Continued)

FOREIGN PATENT DOCUMENTS

EP    0535893 A2    4/1993
EP    1526530 A2    4/2005
(Continued)

OTHER PUBLICATIONS

United States Patent and Trademark Office, "Notice of Allowance", issued in connection with U.S. Appl. No. 14/512,663, dated Dec. 18, 2015 (14 pages).

*Primary Examiner* — Joseph Saunders, Jr.
(74) *Attorney, Agent, or Firm* — Hanley, Flight & Zimmerman, LLC

(57) ABSTRACT

Example signature comparison methods disclosed herein include accessing a first set of values from a query signature based on a first index value, the first set of values determined based on a corresponding set of first angles between a first reference line and respective first lines tangent to first functions defined from first frequency band values determined for monitored audio. Disclosed example methods also include accessing a second set of values from a reference signature based on the first index value. Disclosed example methods further include computing a first correlation coefficient based on the first and second sets of values, and comparing a set of correlation coefficients including the first correlation coefficient to a threshold to determine whether the query and reference signatures match.

20 Claims, 14 Drawing Sheets

(58) Field of Classification Search
USPC .......................................................... 700/94
See application file for complete search history.

(56) References Cited

U.S. PATENT DOCUMENTS

| | | | |
|---|---|---|---|
| 6,675,174 B1 * | 1/2004 | Bolle | ................ G06F 17/30802 |
| 7,328,153 B2 | 2/2008 | Wells et al. | |
| 7,363,278 B2 | 4/2008 | Schmelzer et al. | |
| 7,516,074 B2 | 4/2009 | Bilobrov | |
| 8,364,491 B2 | 1/2013 | Topchy et al. | |
| 2009/0225994 A1 | 9/2009 | Topchy et al. | |
| 2012/0203363 A1 | 8/2012 | McKenna et al. | |
| 2013/0024016 A1 | 1/2013 | Bhat | |

FOREIGN PATENT DOCUMENTS

| | | |
|---|---|---|
| EP | 2263335 B1 | 7/2014 |
| WO | 2004073217 A1 | 8/2004 |
| WO | 2009088485 A1 | 7/2009 |
| WO | 2009110932 A1 | 9/2009 |

* cited by examiner understand# METHODS AND APPARATUS TO GENERATE SIGNATURES REPRESENTATIVE OF MEDIA

RELATED APPLICATION(S)

This patent arises from a continuation of U.S. patent application Ser. No. 14/512,663 (now U.S. Pat. No. 9,548, 830), which is entitled "METHODS AND APPARATUS TO GENERATE SIGNATURES REPRESENTATIVE OF MEDIA," and which was filed on Oct. 13, 2014. U.S. patent application Ser. No. 14/512,663 is hereby incorporated by reference in its entirety.

FIELD OF THE DISCLOSURE

The present disclosure relates generally to media monitoring, multimedia content search and retrieval and, more particularly, to methods and apparatus to generate signatures representative of media.

BACKGROUND

Signature generation and matching techniques are often used in television and radio audience metering applications. Signatures are also equivalently known, and frequently referred to, as fingerprints, and are implemented using several methods for generating and matching signatures.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
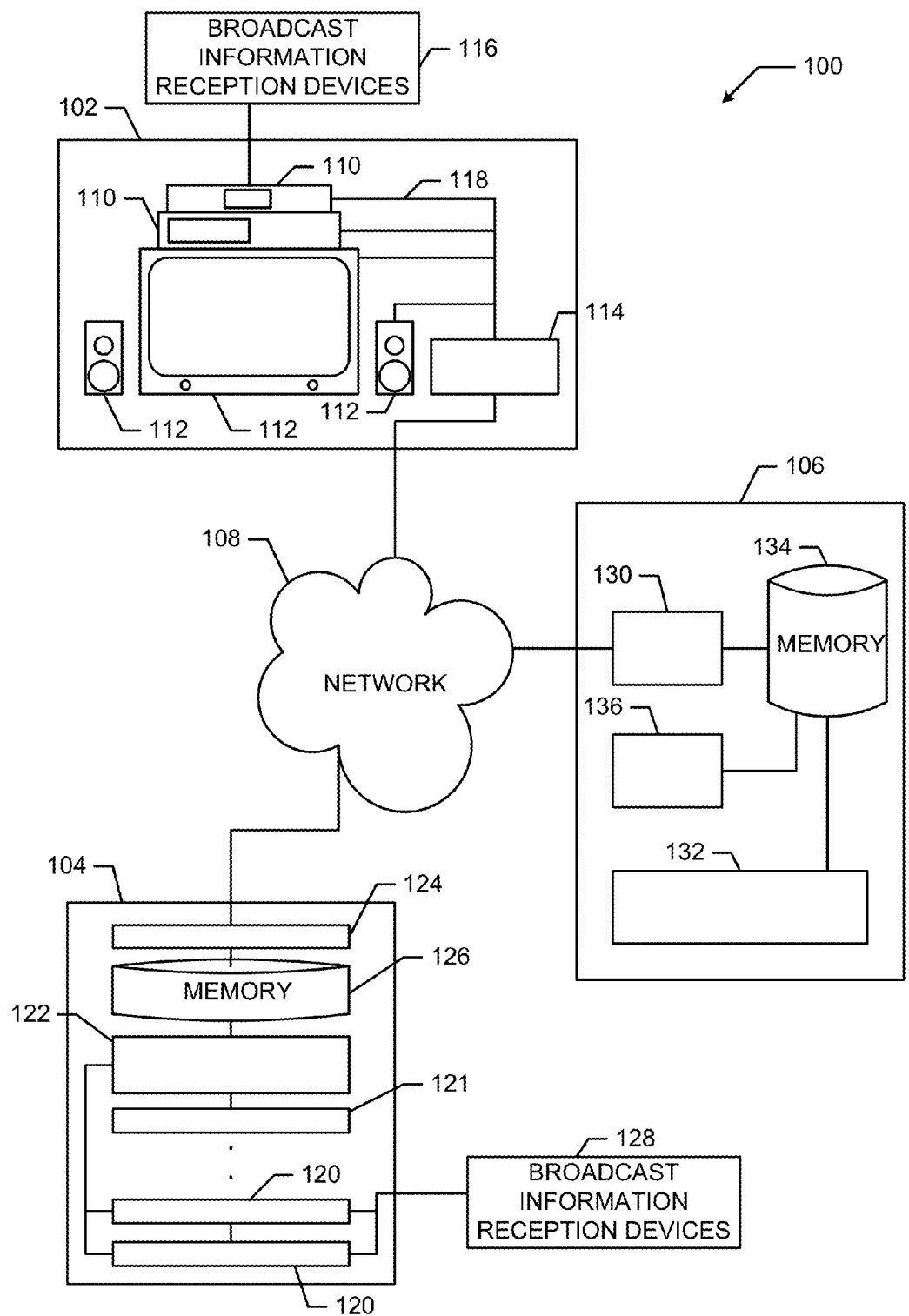
FIG. 1 illustrates an example media identification system to generate signatures of signals in accordance with the teachings of this disclosure.

Fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). Good signatures are 1) repeatable when processing the same media presentation even when the media is subjected to different effects, and 2) are unique relative to presentations of different media. Accordingly, the terms "fingerprint," "digital fingerprint," "digital signature," and "signature" are used interchangeably herein.

Prior techniques for signature-based media monitoring involve determining (e.g., generating and/or collecting) signature(s) representative of a media signal (e.g., an audio signal and/or a video signal) output by a monitored media device and comparing the query signature(s) to one or more reference signatures corresponding to known (e.g., reference) media sources. As used herein, the term "query audio" or "query signal" refer to audio or other signals, respectively, from which a signature is generated at a monitoring site to attempt to identify the query audio or query signal. Similarly, as used herein, the term "query signature" refers to a signature that has been collected from a monitoring site and is to be compared to one or more reference signatures to attempt to identify a match. Various comparison criteria, such as a cross-correlation value, a Hamming distance, etc., can be evaluated to determine whether a query signature matches a particular reference signature. When a match between the query signature and one of the reference signatures is found, the monitored media can be identified as corresponding to the particular reference media represented by the reference signature that matched the query signature.

Because attributes, such as an identifier of the media, a presentation time, a broadcast channel, etc., are collected for the reference signature, these attributes may then be associated with the monitored media whose query signature matched the reference signature. An example of a prior system for identifying media based on codes and/or signatures is disclosed in Thomas, U.S. Pat. No. 5,481,294.

Example methods and apparatus disclosed herein generate signatures, or fingerprints, that uniquely represent signals such as audio, video, still images, and/or other types of signals. Relative to prior techniques to generate signatures that have been proposed, example methods and apparatus disclosed herein provide computationally efficient methods of generating signatures that provide additional efficiencies through high data compression of a signal into a signature. Additionally, example methods and apparatus disclosed herein are robust to distortions introduced by noise, signal distortion (e.g., increased and/or decreased volume, bass and/or treble frequencies for audio signals) and/or caused by different data capture methods (e.g., free-field audio capture via microphone, wired transmission via line-in, and/or digital transmission). As a result, example methods and apparatus disclosed herein enable an energy-efficient method for generating signatures that can be performed, for example, by mobile devices for which prior techniques were too computationally-intensive and/or energy-intensive to be tolerated by most users of such devices.

Examples disclosed herein obtain (e.g., capture) an audio signal and sample the audio signal to create a block of samples (e.g., 576 samples representing 0.072 seconds of audio, etc.). Disclosed examples transform the block of samples from a time-domain representation to a frequency-domain representation by, for example, applying a polyphase quadrature filter (PQF) to the block of samples. Disclosed examples apply energy compaction to the example frequency-domain representation using, for example, a modified discrete cosine transform (MDCT). The result of the energy compaction is a set of frequency bands having respective energies.

Examples disclosed herein perform curve fitting on the energy-compacted frequency bands to obtain a signature function representative of the audio block. In some examples, the signature function is a quadratic function (e.g., a second-order function) that is fit to the frequency bands using least squares error (LSE) analysis. In some examples, a reduced set of the frequency bands are selected for generating the signature function.

Examples disclosed herein compress the signature function into a set of representative values by calculating a set of angles. In some disclosed examples, each of the angles is determined to be between a line tangent to the signature function and a reference line (e.g., the horizontal axis of a graph corresponding to the signature function or, equivalently, a line parallel to the horizontal axis). In some examples, an initial angle is calculated between the reference line and a first line that is tangent to a signature function at a first point on the signature function. The first tangent line is used to calculate a second point on the signature function at which a second tangent line is determined. A second angle is calculated based on the second tangent line and the reference line. The second tangent line is used to calculate a third point on the signature function at which a third tangent line is determined. A third angle is calculated based on the third tangent line and the reference line. Example methods and apparatus disclosed herein generate signature values, such as a tuple, including the first, second, and third angles to represent the signature function and, thus, the block of audio. In other examples, more or fewer angles may be used to represent the block of audio. As used herein, a tuple refers to an ordered set of values. An n-tuple refers to a tuple having n ordered values. For example, a 3-tuple would include 3 values (e.g., $S_0$, $S_1$, $S_2$) in an order $<S_0, S_1, S_2>$ that is different than a 3-tuple consisting of $<S_1, S_2, S_0>$.

Examples disclosed herein generate a signature (or fingerprint) for an item of audio (e.g., a song, an audio clip, etc.), including sequential blocks of audio, as an ordered set of tuples representative of the blocks, where each tuple represents a block of audio. Thus, a signature may include any number of tuples to represent a corresponding number of blocks of audio. Signatures are not necessarily limited to particular lengths or numbers of tuples.

Examples disclosed herein identify matches and/or partial matches between an item of audio (e.g., query audio) and reference audio (e.g., a library of reference audio segments) by comparing the signatures of the query audio and the reference audio. In some examples, a query audio signature is compared to a reference audio signature by determining correlations between the tuples of the respective signatures. In some examples, Pearson product-moment correlations are calculated on a sliding window of the tuples to obtain a set of correlation values. Additionally or alternatively, the tuples (e.g., angles) may be arranged and/or modified to support a Hamming distance comparison and/or any other matching process to compare signatures.

In some examples, a match between the portion of the query audio and the portion of the reference audio is identified when at least a threshold portion of the set of correlation values resulting from comparing the signatures of the query audio and the reference audio satisfies a correlation threshold. In some examples, a match between the query audio item and the reference audio item is identified when at least a threshold number or percentage of matches are identified between the compared portions of the query audio item and the portions of the reference audio item.

FIG. 1 illustrates an example media identification system 100 to generate digital signatures of signals. The example media identification system 100 may be implemented as a television broadcast information identification system, a radio broadcast information identification system, and/or an Internet media identification system (e.g., streaming media and/or downloaded media played on a local device), respectively. The example media identification system 100 includes a monitoring site 102 (e.g., a monitored household), a reference site 104, and a central data collection facility 106.

Monitoring media, such as television and/or radio broadcast information, involves generating query signatures at the monitoring site 102 based on the media. For example, the monitoring site may monitor audio data of television broadcast information. The example monitoring site 102 of FIG. 1 communicates the query signatures to the central data collection facility 106 via a network 108. The monitoring site 102 may be, for example, a household for which the media consumption of an audience is monitored. The example monitoring site 102 of FIG. 1 includes a media delivery device 110, a media presentation device 112, and a signature generator 114. The example signature generator 114 of FIG. 1 generates query signatures associated with media presented at the monitoring site 102.

The example reference site 104 of FIG. 1 generates reference signatures and communicates the reference signatures to the central data collection facility 106 via the network 108. The example reference site 104 is discussed in more detail below.

The example central data collection facility 106 of FIG. 1 identifies the media content represented by a query signature that is generated at the monitoring site 102 by comparing the query signature to one or more reference signatures until a match is found. Additionally or alternatively, the example monitoring site 102 may communicate query signatures to the reference site 104, which compares the query signatures to one or more reference signatures. In some other examples, the example reference site 104 communicates the reference signatures to the monitoring site 102, which compares the query signatures with the reference signatures. In some examples, the central data collection facility 106 is an audience measurement entity, such as The Nielsen Company.

The example media delivery device 110 of FIG. 1 may include, for example, a set top box tuner (e.g., a cable tuner, a satellite tuner, etc.), a personal video recorder (PVR) device, a digital versatile disc (DVD) player, a compact disc (CD) player, a radio, a home theater PC (HTPC), a video game console, etc. In some examples, the media delivery device 110 is communicatively coupled to one or more broadcast information reception devices 116, such as a cable modem, a satellite dish, an antenna, and/or any other suitable device for receiving broadcast information. The example media delivery device 110 of FIG. 1 is configured to reproduce media information (e.g., audio information, video information, web pages, still images, etc.) based on, for example, broadcast information (e.g., from the broadcast information reception devices 116) and/or stored information (e.g., from any information storage medium (e.g., a DVD, a CD, a tape, etc.)). The media delivery device 110 is communicatively coupled to the media presentation device 112 for presentation of the broadcast information and/or the stored information. The media presentation device 112 of FIG. 1 may be a television having a display device and/or a set of speakers by which audience members consume, for example, broadcast television information, music, movies, streaming media, etc.

The signature generator 114 of FIG. 1 generates monitored digital signatures based on audio information, as described in greater detail below. In particular, at the monitoring site 102, the signature generator 114 generates query signatures based on monitored audio streams that are reproduced by the media delivery device 110 and/or presented by the media presentation device 112. In some examples, the signature generator 114 is communicatively coupled to the media delivery device 110 and/or the media presentation device 112 via a wired connection such as an audio monitoring interface 118. In this manner, the signature generator 114 may obtain audio streams (e.g., digital and/or analog signals) associated with media information (e.g., audio and/or video) that is reproduced by the media delivery device 110 and/or presented by the media presentation device 112. Additionally or alternatively, the signature generator 114 may be communicatively coupled to microphones (not shown) that are placed proximate to the media presentation devices 112 to detect audio streams. The signature generator 114 may also be communicatively coupled to the central data collection facility 106 via the network 108.

The example monitoring site 102, the example reference site 104, and/or the example central data collection facility 106 communicate information (e.g., signatures, control information, and/or configuration information) via the network 108. Any wired or wireless communication system such as, for example, a broadband cable network, a DSL network, a cellular telephone network, a satellite network, and/or any other communication network may be used to implement the network 108.

As shown in FIG. 1, the reference site 104 includes one or more broadcast information tuners 120, a reference signature generator 122, a transmitter 124, a database or memory 126, and broadcast information reception devices 128. The example reference signature generator 122 and the transmitter 124 of FIG. 1 are communicatively coupled to the memory 126 to store reference signatures in the memory 126 and/or to retrieve stored reference signatures from the memory 126.

The example broadcast information tuners 120 of FIG. 1 are communicatively coupled to the broadcast information reception devices 128, which may include a cable, an antenna, a satellite dish, and/or any other suitable device for receiving broadcast information. Each of the example broadcast information tuners 120 in the example of FIG. 1 is configured to tune to a particular broadcast channel. In the example system 100 of FIG. 1, the number of broadcast information tuners 120 at the reference site 104 is equal to the number of channels available in a particular broadcast region. In this manner, reference signatures may be generated for all of the media information transmitted over all transmission means and/or all of the channels in a broadcast region.

In the example of FIG. 1, the broadcast information tuners 120 communicate the audio portions of the tuned media information to the reference signature generator 122. The example reference signature generator 122 obtains the audio portion of all of the media information that is available in a particular broadcast region. The reference signature generator 122 generates reference signatures (using, for example, the processing described in greater detail below) based on the audio information and stores the generated reference signatures in the memory 126. For example, each of the plurality of signature generators may be communicatively coupled to a respective one of the broadcast information tuners 120.

The example transmitter 124 is in communication with the memory 126. The example transmitter 124 retrieves reference signatures from the memory 126 and communicates the retrieved reference signatures to the central data collection facility 106 via the network 108.

In some examples, the reference site 104 may be used as an audio stream identification system. For example, the reference site 104 may monitor and identify audio streams associated with television broadcast information, radio broadcast information, Internet media information, and/or any other media. In some examples, the reference site 104 monitors the content that is broadcast by broadcast stations (e.g., television, radio, etc.) in a particular broadcast region. For example, the reference site 104 may be used to monitor music, songs, etc. that are broadcast within a broadcast region and the number of times that they are broadcast. This type of media tracking may be used to determine royalty payments, proper use of copyrights, etc. associated with each audio composition.

In some such examples, the reference site 104 receives all television and/or radio broadcast information that is available in a particular broadcast region and generates query signatures based on the television and/or radio broadcast information. In some examples, the reference site 104 also includes a networked monitor 121 that receives streaming media (e.g., via the Internet) for media that is delivered in a live format. In some examples, the networked monitor 121 accesses media on the Internet (e.g., in a systematic manner using a web crawler) to access Internet-based media and to generate reference signatures based on the Internet-based media. The example broadcast information reception devices 128 receive television and/or radio broadcast information and the broadcast information tuners 120 tune to the television and/or radio broadcast stations. The number of broadcast information tuners 120 at the reference site 104 may be equal to the number of television and/or radio broadcasting stations in a particular broadcast region. The example reference site 104 may include one more of the example networked monitors 121 to increase the speed with which reference signatures are collected from Internet-based media.

The reference signature generator 122 receives the audio from each of the broadcast information tuners 120 and generate query signatures representing the audio. Although one reference signature generator 122 is shown, the reference site 104 may include multiple signature generators 122, each of which receives audio from one of a corresponding number of broadcast information tuners 120. The example reference signature generator 122 of FIG. 1 stores the query signatures in the memory 126. The example transmitter 124 retrieves the query signatures from the memory 126 and communicates the signatures to the central data collection facility 106 via the network 108.

In the example of FIG. 1, the central data collection facility 106 compares query signatures received from the monitoring site 102 to reference signatures received from the reference site 104. In addition, the example central data collection facility 106 identifies monitored audio streams by matching query signatures to reference signatures and using the information corresponding to reference signatures to retrieve television program identification information (e.g., program title, broadcast time, broadcast channel, etc.) from a database. The example central data collection facility 106 of FIG. 1 includes a receiver 130, a signature analyzer 132, a memory 134, and a signature generator 136.

The example receiver 130 of FIG. 1 receives query signatures and reference signatures via the network 108. The receiver 130 stores the query signatures and the reference signatures in the memory 134.

The example signature analyzer 132 of FIG. 1 compares reference signatures to query signatures. For example, the signature analyzer 132 retrieves query signatures and/or reference signatures from the memory 134. In some examples, the signature analyzer 132 retrieves reference signatures and query signatures from the memory 134 and compare the query signatures to the reference signatures until a match is found. When a reference signature is found that matches a query signature, the example signature analyzer 132 retrieves identification information (e.g., a song title, a song track, an artist, etc.) from a database stored in the memory 134 using the match information and/or the matching reference signature. The example memory 134 may be implemented using any tangible computer readable storage medium such as, for example, one or more hard drives, one or more optical storage devices, etc.

Although the signature analyzer 132 is located at the central data collection facility 106 in the example of FIG. 1, in some other examples the signature analyzer 132 is located at the reference site 104. In some such examples, the query signatures may be communicated from the monitoring site 102 to the reference site 104 via the network 108. Alternatively, the memory 134 may be located at the monitoring site 102 and reference signatures may be added periodically to the memory 134 via the network 108 by transmitter 124. Although the signature analyzer 132 is shown as a separate device from the signature generators 114 and 122 in FIG. 1, the signature analyzer 132 may be combined with the reference signature generator 122 and/or the signature generator 114. Still further, although FIG. 1 depicts a single monitoring site (i.e., the monitoring site 102) and a single reference site (i.e., the reference site 104), multiple such sites may be coupled via the network 108 to the central data collection facility 106.

The example signature generator 136 of FIG. 1 generates reference signatures based on reference audio streams. The reference audio streams may be stored on any type of tangible computer readable storage medium such as, for example, a CD, a DVD, a digital audio tape (DAT), etc. Audio owners, such as artists and/or record producing companies, may send their audio works (i.e., music, songs, etc.) to the example central data collection facility 106 of FIG. 1 to be added to a reference library (e.g., in the memory 134). The example signature generator 136 reads the audio data from the memory 134 and generates reference signatures based on each item of audio (e.g., each song, each X minutes of audio, etc.). The signature generator 136 stores the reference signatures in the memory 134 for subsequent retrieval by the signature analyzer 132. The example memory 134 also stores identification information (e.g., song title, artist name, track number, etc.) associated with each reference audio stream. In some examples, the identification information is indexed in the memory 134 based on the reference signatures. In this manner, the central data collection facility 106 includes a database of reference signatures and identification information corresponding to all known and available audio information.

In some examples, the monitored site 102 and/or the reference site 104 return audio to the central data collection facility 106. In some such examples, the signature generator 136 generates signatures of the audio provided by the monitored site 102 and/or the reference site 104.

Figure 2:
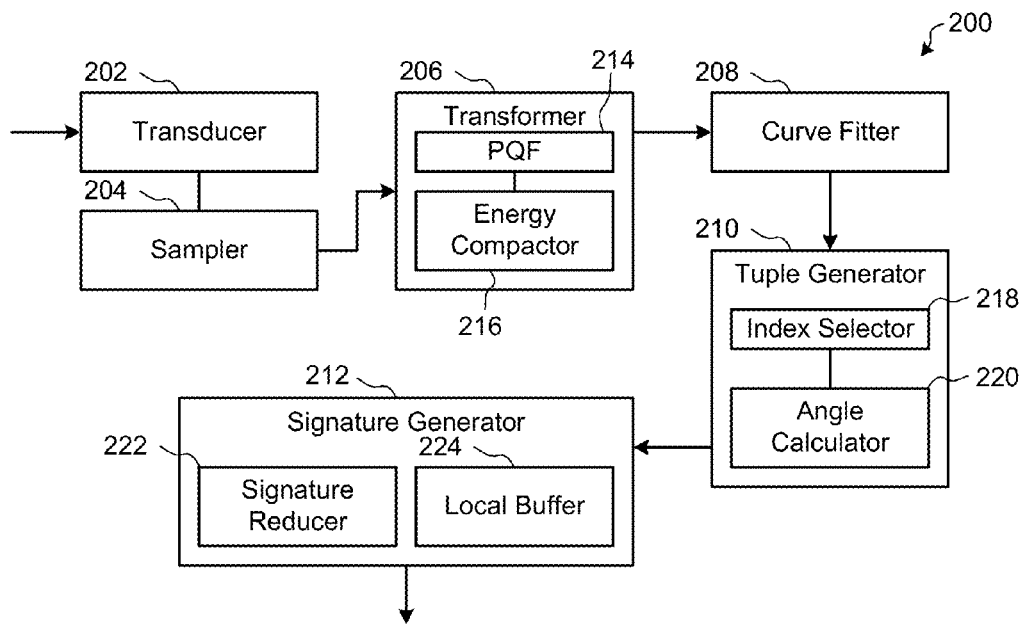
FIG. 2 is a block diagram of an example signature generator that may be used to implement the signature generator and/or the reference signature generator of FIG. 1.

FIG. 2 is a block diagram of an example signature generator 200 that may be used to implement the signature generator 114, the reference signature generator 122, and/or the signature generator 136 of FIG. 1. The example signature generator 200 of FIG. 2 includes a transducer 202, a sampler 204, a transformer 206, a curve fitter 208, a tuple generator 210, and a signature generator 212. The example transformer 206 of FIG. 2 includes a polyphase quadrature filter 214 and an energy compactor 216. The example tuple generator 210 of FIG. 2 includes an index selector 218 and an angle calculator 220. The example signature generator 200 of FIG. 2 is described below with reference to an audio signal. However, the example signature generator 200 of FIG. 2 may be adapted to generate signatures for any type(s) of signals, such as video signals and/or images.

The example transducer 202 of FIG. 2 converts a physical signal into an electrical signal. For example, in the case of audio, the example transducer 202 may be a microphone that converts ambient audio into an analog or digital electrical signal representative of the ambient audio. In some examples, the transducer 202 may be omitted and/or bypassed when conversion of a physical signal is not necessary (e.g., when an electrical signal is received).

The example sampler 204 of FIG. 2 samples the electrical signal to generate a set of samples (e.g., digital samples, quantities representative of values of the sampled signal at the respective times the samples are taken). An example sampler 204 may be an analog-to-digital converter (ADC) or digitizer. For example, the sampler 204 may measure an electrical signal obtained from the transducer 202 to generate a number of samples representative of a desired time period based on a sampling frequency. In some examples, the transducer 202 and the sampler 204 may be omitted and/or bypassed when sampling is not necessary (e.g., when a digital file is received).

The output from the sampler 204 (and/or a digital file containing a set of samples) is a time-domain representation of the media. The example transformer 206 of FIG. 2 transforms the time-domain representation of the media into a frequency-domain representation that includes multiple frequency bands. Thus, the energy in the media signal is represented as the energies of respective frequencies in the frequency-domain representation. The example transformer 206 of FIG. 2 uses a polyphase quadrature filter 214 to transform the time-domain representation of the media signal to a frequency-domain representation. In some other examples, the PQF 214 may be replaced with other transform techniques.

In the example of FIG. 2, the transformer 206 further applies energy compaction techniques to the frequency-domain representation (generated by the PQF 214) using the energy compactor 216. The example energy compactor 216 of FIG. 2 uses a modified discrete cosine transform (MDCT) to concentrate the energy of the frequency-domain representation in a lower number of coefficients than in the frequency-domain representation output by the PQF 214. In other examples, the energy compactor 216 uses other energy compaction techniques (e.g., discrete cosine transform type IV (DCT-IV), etc.). The output of the energy compactor 216 and/or of the transformer 206 is an energy compacted frequency-domain representation of the block of samples.

The example transformer 206 of FIG. 2 outputs the energy-compacted frequency-domain representation to the curve fitter 208. The example curve fitter 208 of FIG. 2 fits a curve (e.g., a signature function) to the energy-compacted frequency-domain representation of the media signal. In the illustrated example, the curve fitter 208 generates the signature function as a quadratic function (e.g., a second-degree polynomial function). However, polynomials of other degrees may be used. Using an example notation of the signature function $f(x)=ax^2+bx+c$, the example curve fitter 208 of FIG. 2 determines the coefficients a, b, and c of the signature function.

In some examples, the curve fitter 208 uses, for example, the least squares error technique to determine the coefficients (a, b, c) of the signature function f(x). In the least squares error technique, the curve fitter 208 attempts to define the signature function f(x) such that the total of the squared errors between the signature function f(x) and the energies of the frequency bands in the energy-compacted frequency-domain representation are substantially minimized. In the example of FIG. 2, the curve fitter 208 defines the signature function f(x) over a set of samples, such as the number of samples in the time-domain representation of the audio block.

In the example of FIG. 2, the curve fitter 208 also calculates a derivative function f'(x) of the signature function f(x). In the example of FIG. 2, the derivative function f'(x) is a linear function (e.g., $f'(x)=2ax+b$), because the signature function f(x) is a quadratic function. As described below, the example tuple generator 210 of FIG. 2 uses the signature function f(x) and the derivative function f'(x) to calculate a tuple to represent the audio block including the block of samples.

The example tuple generator 210 of FIG. 2 generates a tuple (e.g., a 3-tuple [q, r, s]) that represents the signature function f(x) generated by the curve fitter 208 for the audio block. The example tuple generator 210 uses a set of index numbers (e.g., whole numbers) as input values to the signature function (e.g., index x for a signature function $f(x)=ax^2+bx+c$).

The example tuple generator 210 of FIG. 2 includes the index selector 218 to select and/or calculate index values ($x_n$) to serve as the points on the signature function $f(x_n)$ at which the tuple values (q, r, s) are to be calculated.

The example index selector 218 selects an initial index ($x_0$) (e.g., $x_0=1$) in a deterministic manner. In the example of FIG. 2, the initial index ($x_0$) is a standardized or predetermined value, such as $x_0=1$, that is selected for the generation of every tuple in a signature. In some other examples, the index selector 218 calculates the initial index ($x_0$) using a formula that is based on one or more aspects of the signature function f(x). For example, the index selector 218 may select the initial index ($x_0$) to be a closest index value ($x_n$) to a maximum value of the signature function f(x) within the range in which the curve fitter 208 has defined the signature function f(x).

The example angle calculator 220 of FIG. 2 calculates values that make up the tuple values (q, r, s). In the example of FIG. 2, the example angle calculator 220 calculates each tuple value (q, r, s) as an angle (e.g., in degrees) between a reference line and a line tangent to the signature function at an index value selected by the index selector 218. In the illustrated example, the reference line is the horizontal axis (e.g., an x-axis) of a graph of the signature function f(x) or, equivalently, a line parallel to the horizontal axis of the graph.

As part of calculating the angles, the example angle calculator 220 also calculates the tangent lines, which are also used by the index selector 218 in the example of FIG. 2 to calculate and select index values ($x_n$) subsequent to the initial index value ($x_0$). The example index selector 218 and the example angle calculator 220 of FIG. 2 may determine any number of angles by iterating the following sequence: 1) select/calculate an index, which may be based on a prior tangent line; 2) calculate the line tangent to the signature function at the selected/calculated index; and 3) calculate an angle (e.g., in degrees) between the tangent line and a reference line.

To calculate a first tangent line (e.g., for calculating the first tuple value and/or the first angle), the example angle calculator 220 calculates a value $y_0$ of the signature function f(x) at the initial index ($x_0$) (e.g., $y_0=f(x_0)$). The example angle calculator 220 also calculates a value of the derivative function f'(x) (i.e., the slope of the line tangent to the signature function f(x)) at the initial index ($x_0$) (e.g., $y'_0=f'(x_0)$). The first tangent line is a line that has a value equal to the value of the signature function f(x) at the first index (e.g., $y_0=f(x_0)$) and that has a slope equal to the derivative function f'(x) at the first index e.g., $y'_0=f'(x_0)$).

The example index selector 218 calculates a second index value ($x_1$) as the index value ($x_n$) at which the first tangent line is equal to zero. For example, the index selector 218 calculates the second index value ($x_1$) as $x_1=x_0-(y_0/y'_0)=x_0-(f(x_0)/f'(x_0))$. In the example of FIG. 2, the index selector 218 rounds the calculated second index to a nearest whole number.

The example angle calculator 220 calculates a second tangent line (e.g., for calculating the second tuple value and/or the second angle) by calculating a value $y_1$ of the signature function f(x) at the second index ($x_1$) (e.g., $y_1=f(x_1)$). The example angle calculator 220 also calculates a value of the derivative function f'(x) (i.e., the slope of the line tangent to the signature function f(x)) at the second index ($x_1$) (e.g., $y'_1=f'(x_1)$). The second tangent line is a line that has a value equal to the value of the signature function f(x) at the second index (e.g., $y_1=f(x_1)$) and that has a slope equal to the derivative function f'(x) at the second index e.g., $y'_1=f'(x_1)$).

In the example of FIG. 2, the example index selector 218 calculates a third index value ($x_2$) as the index value ($x_n$) at which the second tangent line is equal to zero. For example, the index selector 218 calculates the third index value ($x_2$) as $x_2=x_1-(y_1/y'_1)=x_1-(f(x_1)/f'(x_1))$. In the example of FIG. 2, the index selector 218 rounds the calculated third index to a nearest whole number.

The example angle calculator 220 calculates a third tangent line (e.g., for calculating the third tuple value and/or the third angle) by calculating a value $y_2$ of the signature function f(x) at the third index ($x_2$) (e.g., $y_2=f(x_2)$). The example angle calculator 220 also calculates a value of the derivative function f'(x) (i.e., the slope of the line tangent to the signature function f(x)) at the third index ($x_2$) (e.g., $y'_2=f'(x_2)$). The third tangent line is a line that has a value equal to the value of the signature function f(x) at the third index (e.g., $y_2=f(x_2)$) and that has a slope equal to the derivative function f'(x) at the third index e.g., $y'_2=f'(x_2)$).

In the example of FIG. 2, the example index selector 218 calculates a fourth index value ($x_3$) as the index value ($x_n$) at which the third tangent line is equal to zero. For example, the index selector 218 calculates the fourth index value ($x_3$) as $x_3=x_2-(y_2/y'_2)=x_2-(f(x_2)/f'(x_2))$. In the example of FIG. 2, the index selector 218 rounds the calculated fourth index to a nearest whole number.

When the first, second, and third tangent lines are calculated, the example angle calculator 220 determines a first angle (e.g., in degrees) between the first tangent line and the reference line, a second angle (e.g., in degrees) between the second tangent line and the reference line, and a third angle (e.g., in degrees) between the third tangent line and the reference line. The example angle calculator 220 calculates the first angle (e.g., the first tuple value q) as $q=(-y_0)/(x_1-x_0)*(180/\pi)$. The example angle calculator 220 calculates the second angle (e.g., the second tuple value r) as $r=(-y_1)/(x_2-x_1)*(180/\pi)$. The example angle calculator 220 calculates the third angle (e.g., the third tuple value s) as $s=(-y_2)/(x_3-x_2)*(180/\pi)$.

The example tuple generator 210 generates the tuple as an ordered set of the angles (e.g., [q, r, s]). The tuple generator 210 outputs the tuple (q, r, s) as a signature for the audio block. The example signature generator 212 of FIG. 2 includes the audio block signature as a tuple in a set of tuples making up a signature for an audio item. In the example of FIG. 2, the audio item includes a set of sequential audio blocks. In some examples, the audio blocks are sampled such that the audio blocks partially overlap. In some other examples, the audio blocks do not overlap.

In some examples, the tuple for an audio block is further compressed by averaging the angles in the tuple to obtain a single value. Such compression is advantageous for signature storage and computational efficiency of signature comparison. However, such compression may result in increased false positives when matching signatures. False positives may be mitigated by adjusting a correlation threshold for determining matches between signatures and/or portions of signatures.

In some examples, the signature generator 212 includes a signature reducer 222 to further reduce the signature of the audio to a binary value that may be used, for example, to compare signatures using a Hamming distance. For example, as the tuple generator 210 generates tuples (e.g., sets of angles), the example signature reducer 222 collects the tuples in a local buffer 224 until a designated number of tuples are stored (e.g., 32 tuples, 64 tuples, or any other number). For example, the signature reducer 222 may reduce a 3-tuple to a single value by determining the mean of the value (e.g., angles) in the 3-tuple, and stores the single value as representative of the 3-tuple in the local buffer 224.

Continuing with the example, when the designated number of tuples is stored in the local buffer 224, the example signature reducer 222 calculates a statistically-descriptive value (e.g., a mean value, a median value, etc.) of the tuples stored in the local buffer 224. The example signature reducer 222 compares each of the tuple values to the statistically-descriptive value (e.g., the mean value) to determine a bit representative of the tuple. For example, the signature reducer 222 may set the bit corresponding to the tuple to be '1' when the tuple is less than the statistically-descriptive value (e.g., the mean value) and '0' when the tuple is greater than or equal to the statistically-descriptive value. The example signature reducer 222 therefore reduces X tuples stored in the local buffer 224 to an X-bit binary signature. For example, if 64 tuples are used, the example signature reducer 222 may generate a 64-bit binary number (e.g., a 'long' number, as used in computer programming).

In some examples, such as for generating a query signature, after generating a signature for a set of tuples in the local buffer 224, the example signature reducer 222 clears the local buffer 224 and stores a second set of tuples, which do not overlap with the previous set of tuples, to generate a second signature.

Additionally or alternatively, after generating a signature number for the tuples in the local buffer 224, the example signature reducer 222 may obtain another tuple value and replace an earliest tuple in the local buffer with the most recent tuple value (e.g., a first-in-first-out replacement scheme). The signature reducer 222 then calculates another binary signature for the tuples stored in the local buffer 224. For example, the signature reducer 222 may generate a first 64-bit signature value for tuples 0 to 63, generate a second 64-bit signature value for tuples 1 to 64, generate a third 64-bit signature value for tuples 2 to 65, and so on.

A numerical example of generating a tuple is described below. The numbers in the example below are truncated for brevity. In this example, the curve fitter 208 calculates a signature function $f(x)=0.0000001131x^2-0.0000798769x+0.01189027$ (e.g., from a set of energy-compacted frequency bands) and a resulting derivative function $f'(x)=0.0000002263x-0.0000798769$. The example index selector 218 selects the initial index ($x_0$) to be $x_0=-1$.

Using the initial index ($x_0$), the example angle calculator 220 determines a first value of signature function $f(x_0)$ to be $f(1)=0.0000001131*(1)^2-0.0000798769*(1)+0.01189027=0.01181050621782$. The example angle calculator 220 further determines the first derivative value $f'(x_0)$ to be $f'(1)=0.0000002263*(1)-0.0000798769=-0.0000796506$.

The example index selector 218 calculates the second index $x_1$ as $x_1=x_0-[f(x_0)/f'(x_0)]=1-(0.0118105062/-0.0000796506)=149.27$. The example index selector 218 of FIG. 2 rounds the calculated second index, 149.27, down to the whole number, or $x_1=149$.

The example angle calculator 220 of FIG. 2 determines a second value of signature function $f(x_1)$ to be $f(149)=0.0000001131*(149)^2-0.0000798769*(149)+0.01189027=0.0025006463$. The example angle calculator 220 further determines the first derivative value $f'(x_1)$ to be $f'(149)=0.000000226*(149)-0.0000798769=-0.0000461583$.

The example index selector 218 calculates the third index $x_2$ as $x_2=x_1-[f(x_1)/f'(x_1)]=149-(0.0025006463/-0.0000461583)=203.17$. The example index selector 218 of FIG. 2 rounds the calculated third index 203.17 down to the whole number, or $x_2=203$.

The example angle calculator 220 of FIG. 2 determines a third value of signature function $f(x_2)$ to be $f(203)=0.0000001131*(203)^2-0.0000798769*(203)+0.01189027=0.0003380437$. The example angle calculator 220 further determines the third derivative value $f'(x_2)$ to be $f'(203)=0.0000002263*(203)-0.000079876932=-0.0000339381$.

The example index selector 218 calculates the fourth index $x_3$ as $x_3=x_2-[f(x_2)/f'(x_2)]=203-(0.0003380437/-0.0000339381)=212.96$. The example index selector 218 of FIG. 2 rounds the calculated third index 212.96 down to the whole number, or $x_2=212$.

The example angle calculator 220 of FIG. 2 calculates the first angle (q) in the tuple (q, r, s) as $q=(-y_0)/(x_1-x_0)*(180/\pi)=(-0.0118105062)/(149-1)*(180/\pi)=-0.0045722443$ degrees. The example angle calculator 220 of FIG. 2 calculates the second angle (r) in the tuple (q, r, s) as $r=(-y_1)/(x_2-x_1)*(180/\pi)=(-0.0025006463))/(203-149)*(180/\pi)=-0.0026532681$ degrees. The example angle calculator 220 of FIG. 2 calculates the third angle(s) in the tuple (q, r, s) as $s=(-y_1)/(x_2-x_1)*(180/\pi)=(-0.0003380437))/(212-203)*(180/\pi)=-0.0021520533$ degrees.

The example signature generator 212 of FIG. 2 adds the tuple (−0.0045722443, −0.0026532681, −0.0021520533) to a signature for the audio item from which the audio block was sampled. For media having a duration, the example signature generator 212 associates the generated tuple with a time (e.g., a time indexed to an initial time) corresponding to the first sample in the audio block (e.g., a time relative to the start of the media item). The signature for an audio item may be, for example, an ordered set of tuples $(T_0, T_1, T_2, T_3, \ldots)$ corresponding to the order of the blocks of samples obtained from the input signal.

While the example tuple generator 210 described above generates tuples to include angles, the example tuple generator 210 may additionally or alternatively generate tuple values using other aspects of the signature function f(x), such as index values calculated using the tangent lines or other methods based on the signature function (e.g., truncated index values, rounded index values, or unmodified calculated index values), ratios of values of the signature function at selected indices, and/or any other values descriptive of the signature function f(x).

After generating a complete signature for a media item (e.g., generating a tuple for each audio block in the media item), and/or after generating a signature for a period of time (e.g., a signature of a minute of media, a signature of 30 seconds of media, a signature of 1 hour of media, and/or for any other period of time), the example signature generator 212 outputs the signature to be stored and/or transmitted.

Figure 3:
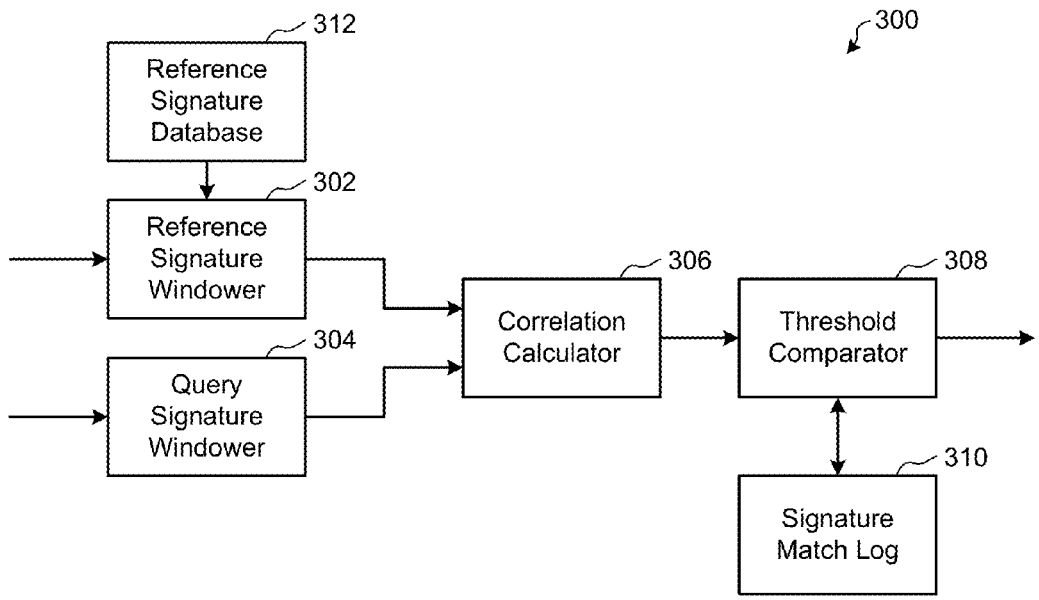
FIG. 3 is a block diagram of an example signature comparator that may be used to implement the example signature analyzer of FIG. 1.

FIG. 3 is a block diagram of an example signature comparator 300 that may be used to implement the example signature analyzer 132 of FIG. 1. The example signature comparator 300 of FIG. 3 includes a reference signature windower 302, a query signature windower 304, a correlation calculator 306, a threshold comparator 308, a signature match log 310, and a reference signature database 312. In general, the example signature comparator 300 of FIG. 3 compares a signature of query audio to signature(s) of reference audio to determine whether a matching threshold is satisfied between query and reference signatures.

The example reference signature windower 302 and the example query signature windower 304 define portions of a reference signature and a query signature, respectively, that are to be compared. In some examples in which the media to be compared has clearly-defined boundaries (e.g., a signature of a complete song is to be compared to a reference song), the entire set of tuples making up the query signature may be compared to an entire set of tuples making up the reference signature.

In other examples, in which the length of the media item and/or the length of the reference media are unknown, a portion of the query signature may be selected for comparison with a portion of the reference signature. In some examples, portions of the query signature and the reference signature are selected to represent a selected time periods (e.g., a selected number of tuples). The example reference signature windower 302 selects a set of tuples in a reference signature for comparison with a set of tuples selected from a query signature by the query signature windower 304.

The example correlation calculator 306 of FIG. 3 calculates a correlation between the query signature window and the reference signature window. In the example of FIG. 3, the correlation calculator 306 assigns a set of indices (e.g., 1 to N) to the query signature window and the reference signature window, where the query signature window and the reference signature window are aligned on the indices. For example, the first tuples in the query signature window and the reference signature window are assigned to index value 1, the second tuples in the query signature window and the reference signature window are assigned to index value 2, and so forth for all of the N tuples in the query signature window and the reference signature window.

The example correlation calculator 306 of FIG. 3 selects an index and selects a number of tuples M based on the selected index (e.g., starting at the selected index, starting at the next index, etc.). The number of selected tuples may be a standardized number (e.g., 8, 9, 10, or any other number) of tuples. The example correlation calculator 306 calculates a correlation value (e.g., a Pearson product-moment correlation coefficient or other type of correlation) of the selected query tuples and the selected reference tuples and stores the resulting correlation value as a correlation value corresponding to the selected index. The result is a correlation window including the selected tuples (e.g., x+1, x+2, . . . x+M) from each of the reference signature window and the query signature window.

The example correlation calculator 306 selects a next index (e.g., index 2) and repeats the correlation calculation to calculate a second correlation value for another set of reference signature window tuples and query signature window tuples based on the number of tuples M for generated a correlation window. In total, the example correlation calculator 306 performs the correlation calculation described above for N−M indices. For example, if 100 tuples are included in each of the query signature window and the reference signature window, and 10 tuples (e.g., x+1, x+2, . . . , x+10) are used for each calculation of a correlation value, the example correlation calculator 306 calculates correlation values for indices 1 to 90, and does not calculate correlation values for indices 91 to 100. In some other examples, the correlation calculator 306 calculates the correlation values for the indices N−M to N by, for example, reducing the value of M (e.g., using 9 tuples for index 91, using 8 tuples for index 92 etc.) and/or using tuples from outside of the defined reference correlation window and the defined query correlation window.

The example reference signature windower 302 and/or the query signature windower 304 perform sliding windows to compare different windows of the reference signature to different windows of the query signature.

In some examples, the correlation calculator 306 performs a sliding correlation of a reference signature window and a query signature window by adjusting (e.g., incrementing, decrementing) the N indices applied to the tuples in the query signature window relative to the N indices applied in the tuples in the reference signature window. After each adjustment of the indices, the example correlation calculator 306 calculates the correlation values for the reference signature window and the query signature window using the new assignment of the indices.

After calculating the correlation values for the reference signature window and the query signature window, the example threshold comparator 308 determines, for each of the N correlation values (e.g., the N–M values calculated for the reference signature window and the query signature window), whether an average of the correlation values (e.g., N–M values) satisfies a threshold correlation (e.g., 0.70, or any other appropriate threshold). If the average correlation satisfies the correlation threshold, the example threshold comparator 308 stores or indicates a match between the query signature window and the reference signature window.

In some other examples, instead of using the average of the correlation values, the example threshold comparator 308 may determine whether a number (or percentage) of correlation values that satisfy a correlation threshold (e.g., 0.70, or any other appropriate threshold) satisfies a window matching threshold (e.g., 80%, or any other appropriate percentage, and/or an equivalent number of correlation values). As an example, the threshold comparator 308 may determine whether at least 80% of the correlation values (e.g., N–M values) for a query signature window and a reference signature window are at least 0.70.

The example threshold comparator 308 of FIG. 3 further determines whether query media matches reference media based on a number of individual windows and/or blocks of audio that match. For example, the threshold comparator 308 may determine, based on a number of matching windows indicated in the signature match log 310. For example, the threshold comparator 308 may determine whether a query audio item (e.g., a recorded song) matches a reference audio item (e.g., a reference song) based on a number or proportion of windows (e.g., a query signature window matching a reference signature window) identified as matching between the query audio item and the reference audio item.

In some other examples, such as examples in which the signature generator 212 of FIG. 2 reduces a signature to a binary number representative of a corresponding set of tuples (e.g., an X-bit number for X tuples), the example correlation calculator 306 of FIG. 3 compares the signatures using other comparison measures, such as Hamming distances. For example, the correlation calculator 306 may compare a query signature to successive reference signatures to determine a reference signature that has a closest Hamming distance to the query signature. The example threshold comparator 308 of FIG. 3 determines that reference media matches the query media when at least a threshold number or percentage of reference signatures obtained from the reference media have a Hamming distance that satisfies a threshold Hamming distance to the query signatures generated from the query media.

While example manners of implementing the signature generators 114, 136, the reference signature generator 122, and/or the example signature analyzer 132 of FIG. 1 are illustrated in FIGS. 2 and 3, one or more of the elements, processes and/or devices illustrated in FIGS. 2 and/or 3 may be combined, divided, re-arranged, omitted, eliminated and/or implemented in any other way. Further, the example transducer 202, the example sampler 204, the example transformer 206, the example curve fitter 208, the example tuple generator 210, the example signature generator 212, the example polyphase quadrature filter 214, the example energy compactor 216, the example index selector 218, the example angle calculator 220, the example signature reducer 222, the example local buffer 224, the example reference signature windower 302, the example query signature windower 304, the example correlation calculator 306, the example threshold comparator 308, the example signature match log 310, the example reference signature database 312 and/or, more generally, the example signature generators 114, 122, 136, 200 of FIGS. 1 and 2, the example signature analyzer 132 of FIG. 1, and/or the example signature comparator 300 of FIG. 3 may be implemented by hardware, software, firmware and/or any combination of hardware, software and/or firmware. Thus, for example, any of the example transducer 202, the example sampler 204, the example transformer 206, the example curve fitter 208, the example tuple generator 210, the example signature generator 212, the example polyphase quadrature filter 214, the example energy compactor 216, the example index selector 218, the example angle calculator 220, the example signature reducer 222, the example local buffer 224, the example reference signature windower 302, the example query signature windower 304, the example correlation calculator 306, the example threshold comparator 308, the example signature match log 310, the example reference signature database 312 and/or, more generally, the example signature generators 114, 122, 136, 200 of FIGS. 1 and 2, the example signature analyzer 132 of FIG. 1, and/or the example signature comparator 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transducer 202, the example sampler 204, the example transformer 206, the example curve fitter 208, the example tuple generator 210, the example signature generator 212, the example polyphase quadrature filter 214, the example energy compactor 216, the example index selector 218, the example angle calculator 220, the example signature reducer 222, the example local buffer 224, the example reference signature windower 302, the example query signature windower 304, the example correlation calculator 306, the example threshold comparator 308, the example signature match log 310, the example reference signature database 312 is/are hereby expressly defined to include a tangible computer readable storage device or storage disk such as a memory, a digital versatile disk (DVD), a compact disk (CD), a Blu-ray disk, etc. storing the software and/or firmware. Further still, the example signature generators 114, 136, the example reference signature generator 122, and/or the example signature analyzer 132 of FIG. 1 may include one or more elements, processes and/or devices in addition to, or instead of, those illustrated in FIGS. 2 and/or 3, and/or may include more than one of any or all of the illustrated elements, processes and devices.

Figure 4:
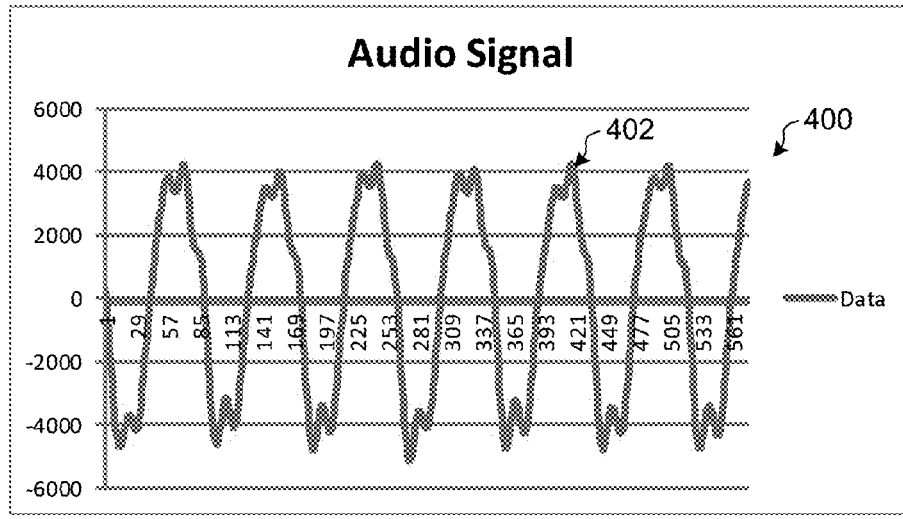
FIG. 4 shows an example audio signal including a set of samples representative of the audio signal.

FIG. 4 shows an example audio signal 400 including a set of samples 402. The example audio signal 400 of FIG. 4 is to be converted to a signature (e.g., by the signature generators 114, 122, 136, 200 of FIGS. 1 and/or 2) as described in the examples below. The example set of samples 402 includes 576 samples. At a sampling rate of 8 kHz, the example samples 402 represent 0.072 seconds of a time-domain signal. Other sampling rates may result in a different number of the samples 402 to represent a same time duration (e.g., 0.072 seconds) of the time-domain audio signal 400. The example samples 402 of FIG. 4 may be captured by the example transducer 202 and/or sampled by the example sampler 204 of FIG. 2.

Figure 5:
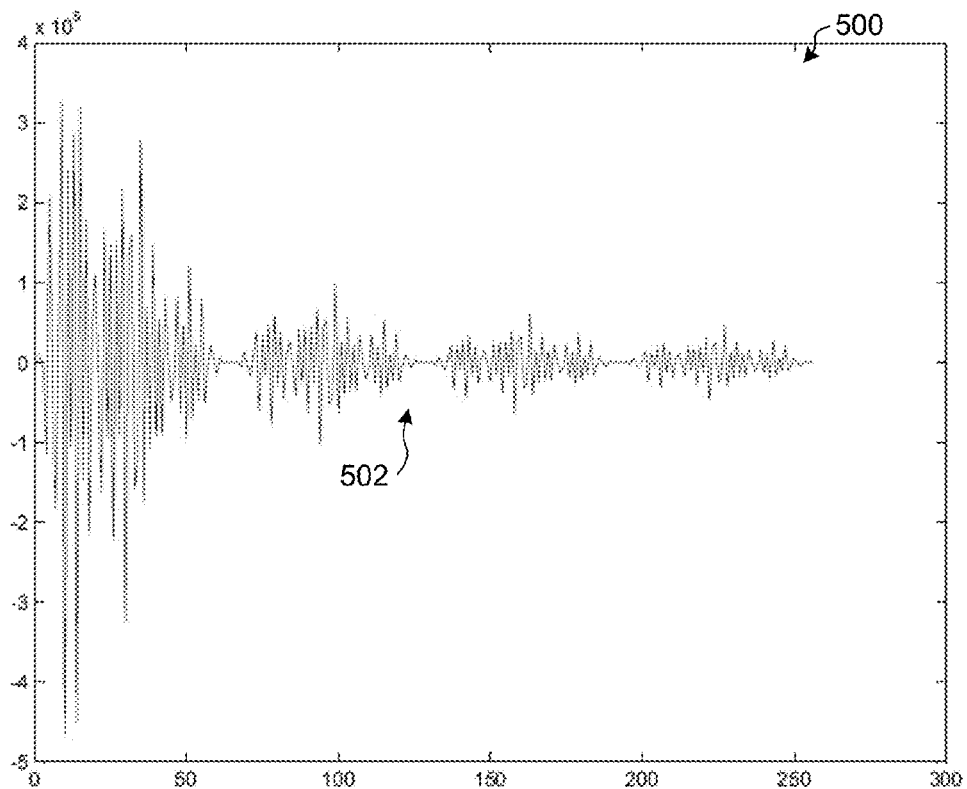
FIG. 5 shows an example frequency-domain representation of the example audio signal represented by the samples of FIG. 4.

FIG. 5 shows an example frequency-domain representation 500 of the samples 402 of the example audio signal 400 of FIG. 4. The example frequency-domain representation 500 represents the example samples 402 of FIG. 4 after applying a polyphase quadrature filter (e.g., the PQF 214 of FIG. 2), energy compaction (e.g., an MDCT via the energy compactor 216 of FIG. 2), and frequency band selection (e.g., via the energy compactor 216 of FIG. 2). As illustrated in FIG. 5, the frequency-domain representation 500 includes frequency bands 502 (e.g., numbered 1 to 107). The numbers of the frequency bands in FIG. 5 may be mapped to frequency ranges. The value of the frequency-domain representation 500 at each of the bands 502 is an energy of the energy-compacted signal in the frequency band. In some examples, the value of the frequency-domain representation 500 is a percentage of the energy in the audio block represented in the frequency band.

Figure 6:
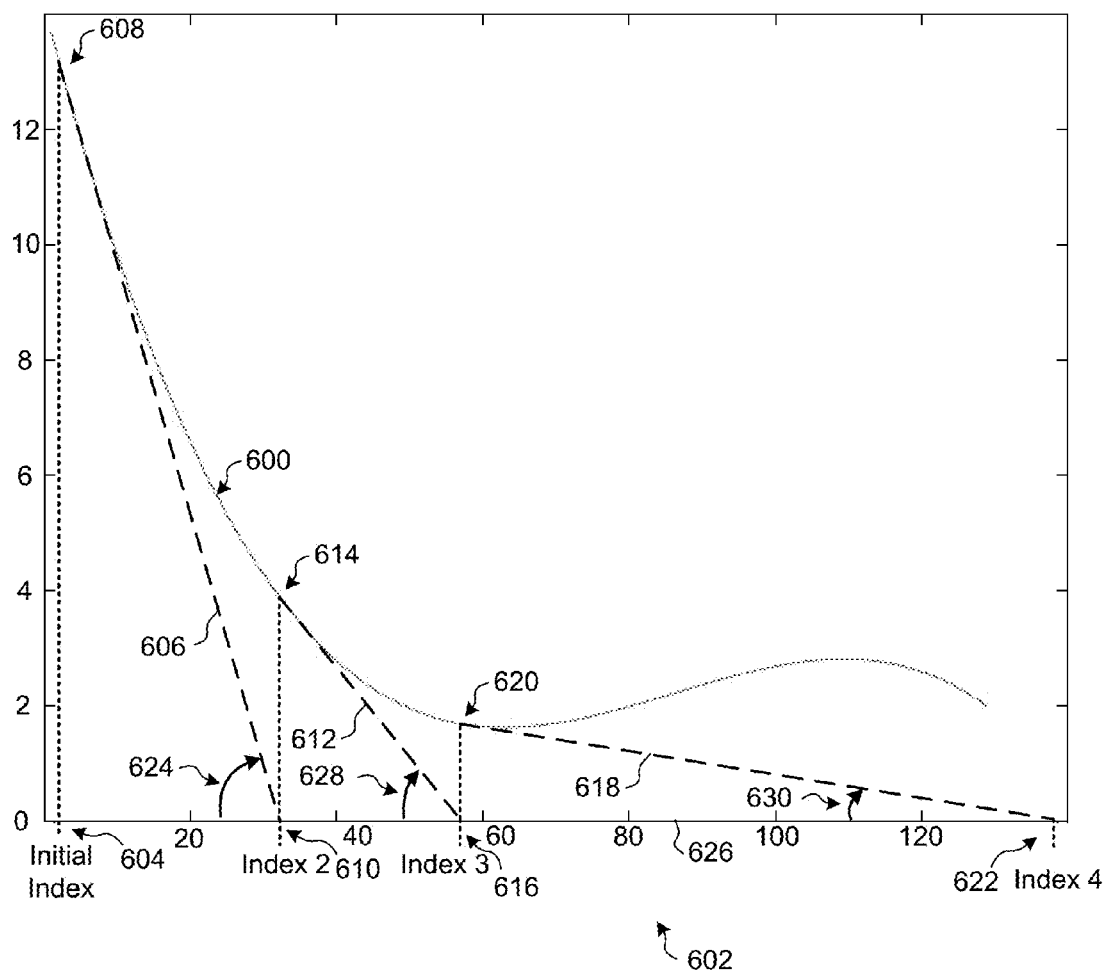
FIG. 6 shows an example signature function generated by the example curve fitter of FIG. 2.

The example curve fitter 208 of FIG. 2 performs curve fitting using the frequency-domain representation 500 to determine a signature function representative of the frequency-domain representation 500. FIG. 6 shows an example signature function 600 generated by the example curve fitter 208. The example signature function 600 of FIG. 6 is a quadratic function (e.g., a second-degree polynomial function) that is determined using a least squares error technique with the frequency-domain representation 500 of FIG. 5.

The example signature function 600 is shown in FIG. 6 over a set of indices 602, where the signature function 600 has a value corresponding to each of the indices over which the signature function 600 is defined. In the example of FIG. 6, the curve fitter 208 calculates the signature function 600 for a selected set of samples, such as the same number of samples included in the captured audio block 400 (e.g., 576 samples).

The example tuple generator 210 of FIG. 2 generates a tuple (e.g., a 3-tuple) for the audio block 400 using the example signature function 600. The example index selector 218 of FIG. 2 selects an initial index 604 (e.g., 1). To calculate a first tangent line 606, the example angle calculator 220 calculates a value 608 of the signature function 600 at the initial index 604. The example angle calculator 220 calculates the slope of the first tangent line 606 that is tangent to the signature function 600 at the initial index 604 (e.g., by calculating the value of the derivative of the signature function 600 at the first index 604).

The example index selector 218 calculates a second index value 610 as the index value at which the first tangent line 606 is equal to zero. In the example of FIG. 6, the index selector 218 rounds the calculated second index 610 to a nearest whole number.

The example angle calculator 220 calculates a second tangent line 612 (e.g., for calculating the second tuple value and/or the second angle) by calculating a value 614 of the signature function 600 at the second index 612. The example angle calculator 220 calculates the slope of the second tangent line 612 that is tangent to the signature function 600 at the second index 610 (e.g., by calculating the value of the derivative of the signature function 600 at the second index 610).

In the example of FIG. 6, the example index selector 218 calculates a third index value 616 as the index value at which the second tangent line 612 is equal to zero. In the example of FIG. 2, the index selector 218 rounds the calculated third index 616 to a nearest whole number.

The example angle calculator 220 calculates a third tangent line 618 (e.g., for calculating the third tuple value and/or the third angle) by calculating a value 620 of the signature function 600 at the third index 616. The example angle calculator 220 calculates the slope of the third tangent line 616 that is tangent to the signature function 600 at the second index 610 (e.g., by calculating the value of the derivative of the signature function 600 at the second index 610).

In the example of FIG. 6, the example index selector 218 calculates a fourth index value 622 as the index value at which the third tangent line 618 is equal to zero. In the example of FIG. 6, the index selector 218 rounds the calculated fourth index 622 to a nearest whole number.

When the first, second, and third tangent lines 606, 612, 618 are calculated, the example angle calculator 220 determines a first angle 624 (e.g., in degrees) between the first tangent line 606 and a reference line 626 (e.g., the x-axis, corresponding to an energy value of 0, and/or any line parallel to the x-axis), a second angle 628 (e.g., in degrees) between the second tangent line 612 and the reference line 626, and a third angle 630 (e.g., in degrees) between the third tangent line 618 and the reference line 626. The example angle calculator 220 calculates the first angle (e.g., the first tuple value q) as q=(−1)*(the value 608 of the signature function 600 at the initial index 604)/(second index 610−initial index 604)*(180/π). The example angle calculator 220 calculates the second angle (e.g., the second tuple value r) as r=(−1)*(the value 614 of the signature function 600 at the second index 610)/(third index 616−second index 610)*(180/π). The example angle calculator 220 calculates the third angle (e.g., the third tuple value s) as s=(−1)*(the value 620 of the signature function 600 at the third index 616)/(fourth index 622−third index 616)*(180/π).

The example tuple generator 210 generates the 3-tuple as an ordered set of the angles (e.g., [q, r, s]). The tuple generator 210 outputs the tuple (q, r, s) as a signature for the audio block 400 of FIG. 4. The example signature generator 212 of FIG. 2 includes the audio block signature as a tuple in a set of tuples making up a signature for an audio item. As mentioned above, the tuple may be generated using other values representative of the signature function f(x), such as index values, ratios of values of the signature function f(x) at selected indices, etc.

Figure 7:
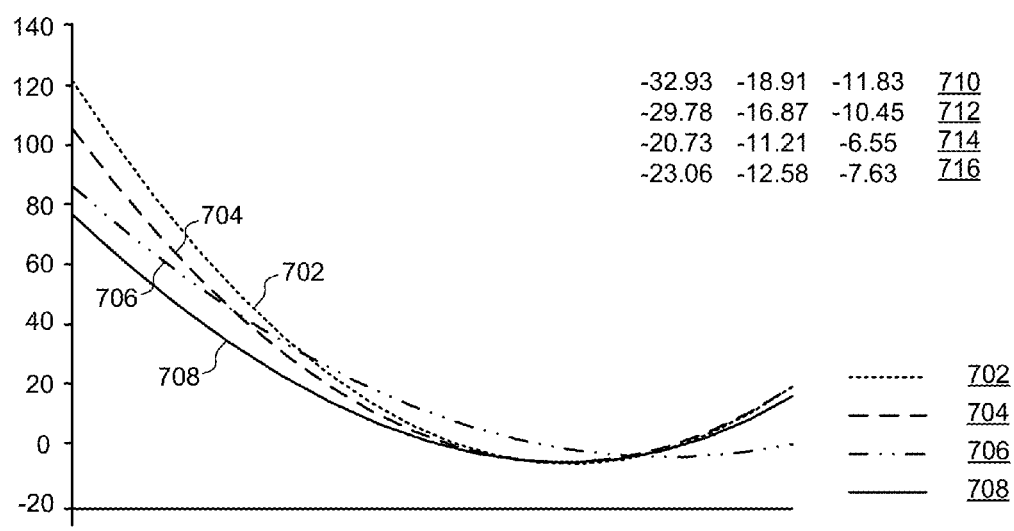
FIG. 7 shows example signature functions resulting from blocks of signal samples representative of a same block of audio.

FIG. 7 shows example signature functions 702, 704, 706, 708 resulting from different effects on a same block of audio. FIG. 7 further illustrates example tuples 710, 712, 714, 716 (e.g., sets of 3 angles) calculated for each of the signature functions 702-708 in accordance with the examples disclosed above in the example of FIG. 6.

The example signature function 702 represents an audio block obtained from a digital audio file. The digital audio file from which the signature function 702 is generated is a base file from which the other audio blocks corresponding to the signature functions 704-708 are generated. The example signature function 704 represents an audio block input via a wired line-in connection to the transducer 202 and/or the sampler 204 of FIG. 2. The example signature function 706 represents an audio block input via a microphone (e.g., a microphone implementing the transducer 202). The example signature function 708 represents an audio block input via a digital audio file created by modifying the original audio file to have enhanced bass and treble frequencies.

As shown in FIG. 7, the signature functions 702-708 have similar values, have similar locations of their respective minima (e.g., the lowest points on the signature functions 702-708), and have similar ranges of values over the set of indices for which the signature functions 700 are defined in FIG. 7. The example signature function 706 (e.g., input via the microphone) is the least similar to the example signature function 702. However, because matches are calculated using combinations of tuples, the example signature function 706 using the microphone are identifiable using the example methods and apparatus disclosed herein. In general, the angles resulting from higher audio volumes are larger (e.g., farther from 0) than lower audio volumes of the same audio. However, because the differences are consistent, the example correlation calculator 306 still identifies sufficiently high correlations between audio of different volumes, enabling matching.

Figure 8A:
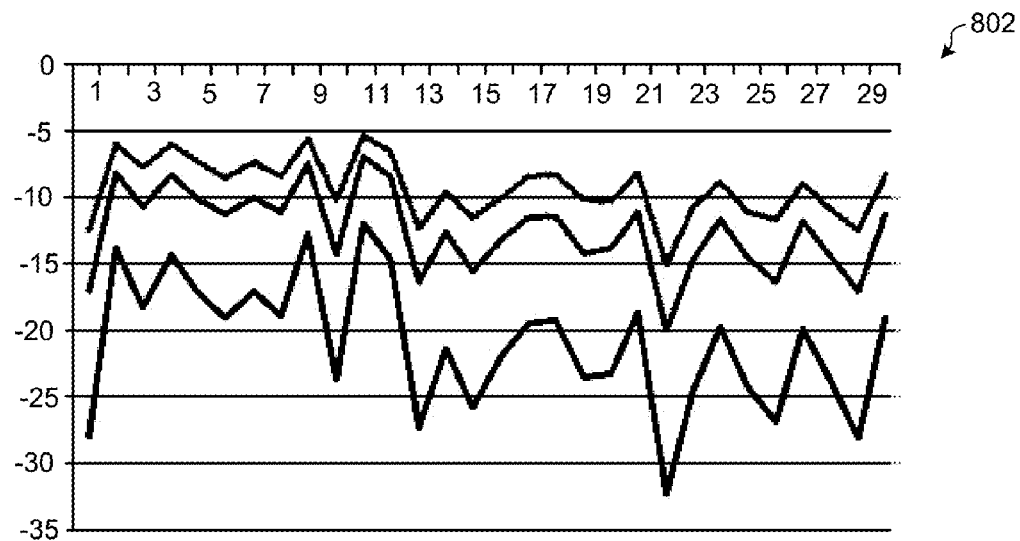
FIG. 8A shows example angles calculated for a set of signatures for corresponding blocks of audio samples from a first audio item.
Figure 8B:
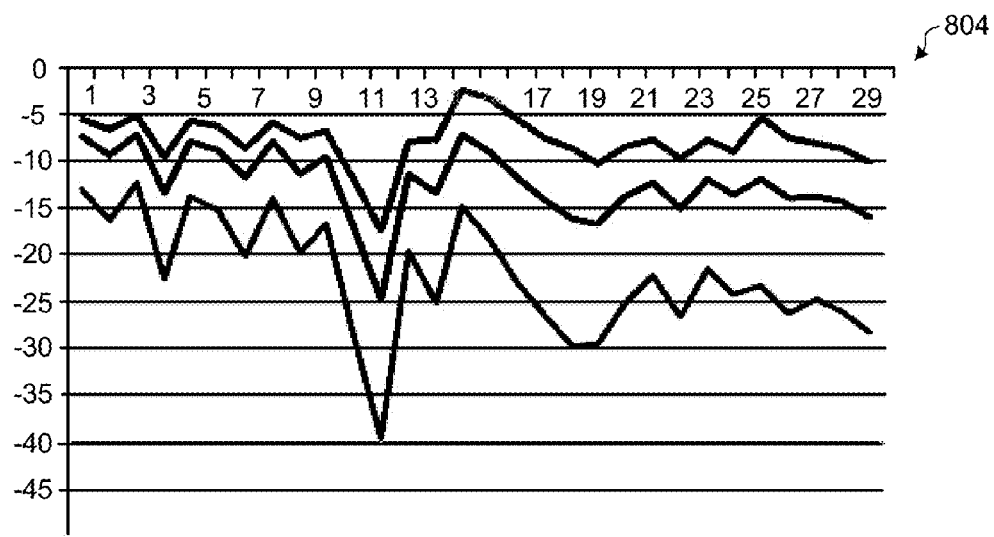
FIG. 8B shows example angles calculated for a set of signatures for corresponding blocks of audio samples from a second audio item different than the first audio item of FIG. 8A.

FIG. 8A shows example angles 802 calculated for a set of signatures for a corresponding set of audio blocks in a first audio item. FIG. 8B shows example angles 804 calculated for a set of signatures for a corresponding set of audio blocks for a second audio item different than the first audio item. A comparison of the angles 802, 804 in FIGS. 8A, 8B for the different audio items demonstrates that different audio items result in significantly different sets of angles, such that performing a sliding correlation (e.g., via the signature comparator 300 of FIG. 3) of the angles 802 and the angles 804 results in a correlation value that is less than a threshold and can be used to determine that the audio items do not match.

Figure 9:
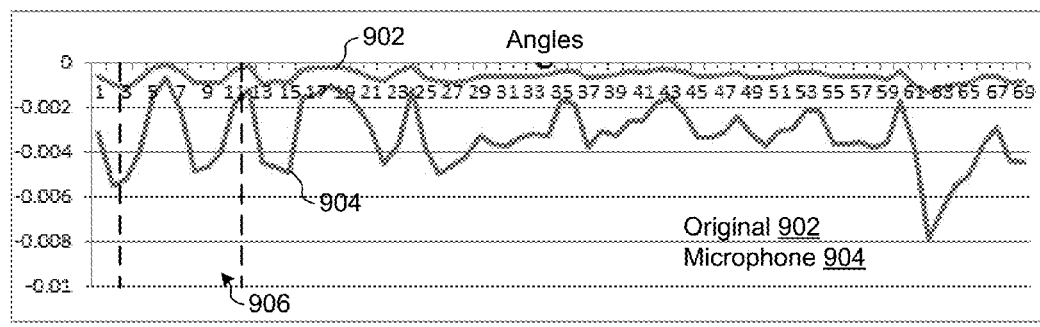
FIG. 9 shows an example query signature and an example reference signature assigned to respective indices for comparison.
Figure 10:
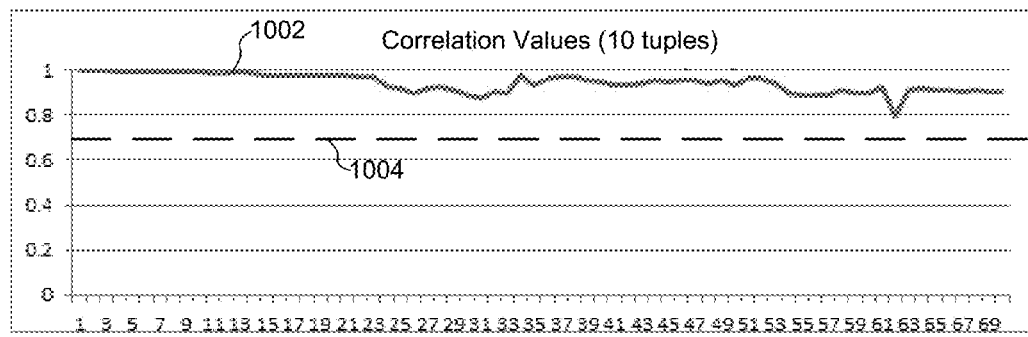
FIG. 10 shows example correlation coefficients calculated for the example query signature and the example reference signature of FIG. 9.

FIG. 9 shows an example query signature window 902 of a first audio item and an example reference signature 904 for comparison. For example, the query signature window 902 may be a windowed portion of a larger set of tuples making up a query signature. Similarly, the reference signature window 904 may be a windowed portion of a larger set of tuples making up a reference signature. FIG. 10 shows example correlation values 1002 calculated for the example query signature window 902 and the example reference signature window 904 of FIG. 9. The example query signature window 902 and the example reference signature window 904 of FIG. 9 represent a same audio item.

The example query signature windower 304 of FIG. 3 selects the example query signature window 902 as a subset of tuples from a larger set of tuples in a query signature. Similarly, the example reference signature windower 302 of FIG. 3 selects the example reference signature window 904 of FIG. 9 as a subset of tuples from a larger set of tuples in a reference signature.

The example correlation calculator 306 of FIG. 3 assigns indices (e.g., indices 1 to 69) to the example query signature window 902 and the example reference signature window 904. As a result of assigning the indices, the example query signature window 902 and the example reference signature window 904 correspond to the indices as illustrated in FIG. 9.

The example correlation calculator 306 selects a first index (e.g., index 1) and calculates a correlation value 1002 for the selected index. In the example of FIGS. 9 and 10, the correlation calculator 306 uses 10 tuples (e.g., shown in a correlation window 906 in FIG. 9) from each of the query signature window 902 and the reference signature window 904 to calculate the correlation value 1002 at the selected index. The example correlation calculator 306 stores the resulting correlation value 1002 for the selected index and iterates the calculation for the subsequent indices (e.g., by selecting additional sets or windows of tuples).

When the correlation calculator 306 has calculated the correlation values 1002 for all of the indices (e.g., 1 to 69), the example threshold comparator 308 of FIG. 3 determines whether at least a threshold percentage of the 69 correlation values 1002 is greater than a threshold correlation (e.g., a threshold 1004 in FIG. 10). In the example of FIG. 10, all of the correlation values 1002 are greater than the threshold 1004 and, therefore, the example threshold comparator 308 determines that the query signature window 902 matches the reference signature window 904 of FIG. 9.

Flowcharts representative of example machine readable instructions for implementing the signature generator 200 of FIG. 2 and/or the signature comparator 300 of FIG. 3 are shown in FIGS. 11, 12, 13, and 14A-14C. In this example, the machine readable instructions comprise program(s) for execution by a processor such as the processor 1512 shown in the example processor platform 1500 discussed below in connection with FIG. 15. The program(s) may be embodied in software stored on a tangible computer readable storage medium such as a CD-ROM, a floppy disk, a hard drive, a digital versatile disk (DVD), a Blu-ray disk, or a memory associated with the processor 1512, but the entire program(s) and/or parts thereof could alternatively be executed by a device other than the processor 1512 and/or embodied in firmware or dedicated hardware. Further, although the example program(s) are described with reference to the flowcharts illustrated in FIGS. 11, 12, 13, and 14A-14C, many other methods of implementing the example signature generator 200 of FIG. 2 and/or the signature comparator 300 of FIG. 3 may alternatively be used. For example, the order of execution of the blocks may be changed, and/or some of the blocks described may be changed, eliminated, or combined.

As mentioned above, the example processes of FIGS. 11, 12, 13, and 14A-14C may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 11, 12, 13, and 14A-14C may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 11:
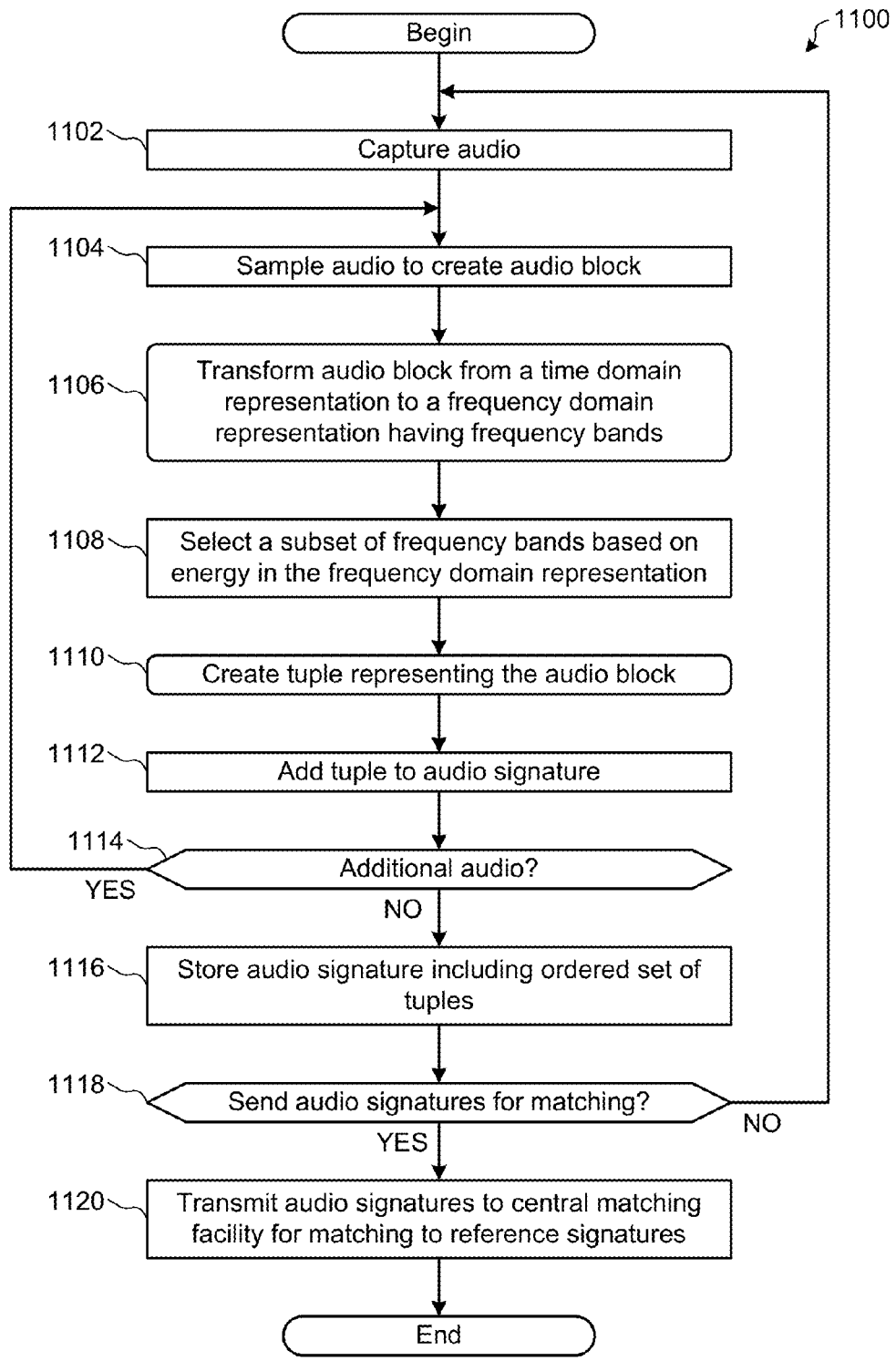
FIG. 11 is a flowchart representative of example computer readable instructions that may be executed to implement the example signature generators and/or the example reference signature generator of FIGS. 1 and/or 2 to generate an audio signature.

FIG. 11 is a flowchart representative of example computer readable instructions 1100 which may be executed to implement the example signature generator 114, the example reference signature generator 122, and/or the example signature generator 200 of FIGS. 1 and/or 2 to generate an audio signature.

The example transducer 202 of FIG. 2 captures audio (block 1102). For example, a microphone transducer may transform ambient audio into a representative electrical signal. The example sampler 204 of FIG. 2 samples the audio to create an audio block (e.g., a block of audio samples) (block 1104).

The example transformer 206 of FIG. 2 transforms the audio block from a time-domain representation to a frequency-domain representation having frequency bands (block 1106). For example, the PQF 214 of FIG. 2 transforms the time-domain signal into a frequency-domain representation and the energy compactor 216 applies an energy compaction technique (e.g., an MDCT) to compact the energy of the frequency-domain representation into a smaller number of frequency bands. The result of block 1106 is an energy-compacted frequency-domain representation of the sampled audio signal. Example instructions to implement block 1106 are disclosed below with reference to FIG. 12.

The example transformer 206 selects a subset of the frequency bands in the frequency-domain representation (block 1108). For example, the transformer 206 may select a set of frequency bands representing at least a threshold portion of the energy in the energy-compacted frequency-domain representation.

The example tuple generator 210 of FIG. 2 creates a tuple representing the audio block (block 1110). For example, the tuple generator 210 generates a set of values (e.g., an ordered set of 3 values) by determining characteristic values from a function that represents the selected set of frequency bands. Example instructions to implement block 1110 are disclosed below with reference to FIG. 13.

The example signature generator 212 of FIG. 2 adds the generated tuple to an audio signature (block 1112). For example, the signature generator 212 adds the tuple to an ordered set of tuples representing a sequence of audio blocks. The example sampler 204 determine whether there is additional audio to be sampled (block 1114). For example, the sampler 204 may determine whether energy in the electrical signal generated by the transducer 202 exceeds a threshold (e.g., indicating that ambient audio is still being received with at least a threshold energy level). Additionally or alternatively, the sampler 204 may determine whether a limit or other cutoff condition has occurred to delineate one audio item from another. For example, the sampler 204 may split a continuous stream of audio into multiple audio items. If there is additional audio (block 1114), control returns to block 1104.

When there is no additional audio (block 1114), the example signature generator 212 of FIG. 2 stores the audio signature including the ordered set of tuples (block 1116). For example, the signature generator 212 may store a data set including the values of the tuples in a storage device for later transmission and/or analysis.

The example signature generator 212 determines whether to send audio signatures for matching (block 1118). For example, the signature generator 212 may be configured to periodically or aperiodically (e.g., in response to a request, when a storage size of the audio signatures satisfies a threshold, etc.) send the stored audio signatures to a matching entity (e.g., the central data collection facility 106 of FIG. 1) for matching to reference audio.

If the signature generator 212 determines that it is not to send the audio signatures for matching (block 1118), control returns to block 1102 to continue capturing audio. When the signature generator 212 determines that it is to send the audio signatures for matching (block 1118), the example signature generator 212 transmits the audio signatures to a central matching facility (e.g., the central data collection facility 106) for matching the audio signatures to reference signatures (block 1120). For example, the signature generator 212 may transmit a data file including the audio signatures to the example central data collection facility 106 via the network 108 of FIG. 1.

The example instructions 1100 of FIG. 11 end. In some examples, the signature generator 200 of FIG. 2 iterates the instructions 1100 to repeatedly (e.g., continuously) generate audio signatures of input audio (e.g., ambient audio).

Figure 12:
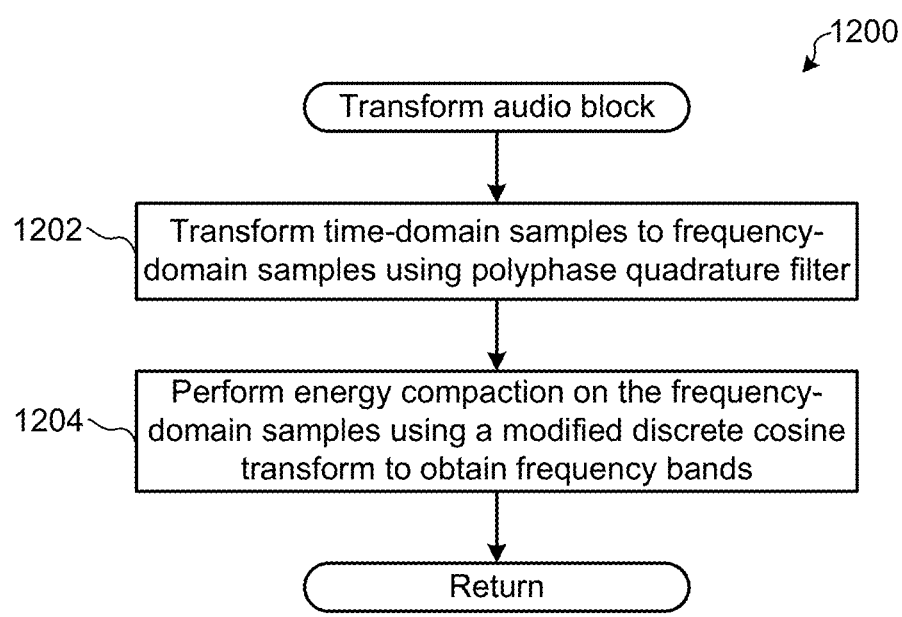
FIG. 12 is a flowchart representative of example computer readable instructions that may be executed to implement the example transformer of FIG. 2 to transform a block of audio into a frequency-domain representation.

FIG. 12 is a flowchart representative of example computer readable instructions 1200 which may be executed to implement the example transformer 206 of FIG. 2 to transform a block of audio into a frequency-domain representation. For example, the transformer 206 of FIG. 2 may implement the instructions 1200 of FIG. 12 to convert the example audio signal 400 of FIG. 4, from the time-domain representation including the samples 402, to an energy-compacted frequency-domain representation 500 shown in FIG. 5. The example instructions 1200 of FIG. 12 may be performed by the example transformer 206 to implement block 1106 of FIG. 11.

The example PQF 214 of FIG. 2 transforms time-domain samples to frequency-domain samples using a polyphase quadrature filter (block 1202). The PQF 214 is a type of filter bank that uses a set of band-pass filters to separate an input signal into multiple components. The output of block 1202 is a set of frequency bands and corresponding energies based on the energy content of the frequencies in the time-domain signal.

The example energy compactor 216 of FIG. 2 performs energy compaction on the frequency-domain samples using a MDCT to obtain energy-compacted frequency bands (block 1204). The MDCT causes the energy in the frequency-domain representation output by the PQF 214 to be concentrated in a smaller number of frequency bands. Thus, the example energy compactor 216 increases the compression of the audio signal.

The example instructions 1200 of FIG. 12 end and control is transferred to block 1108 of FIG. 11.

Figure 13:
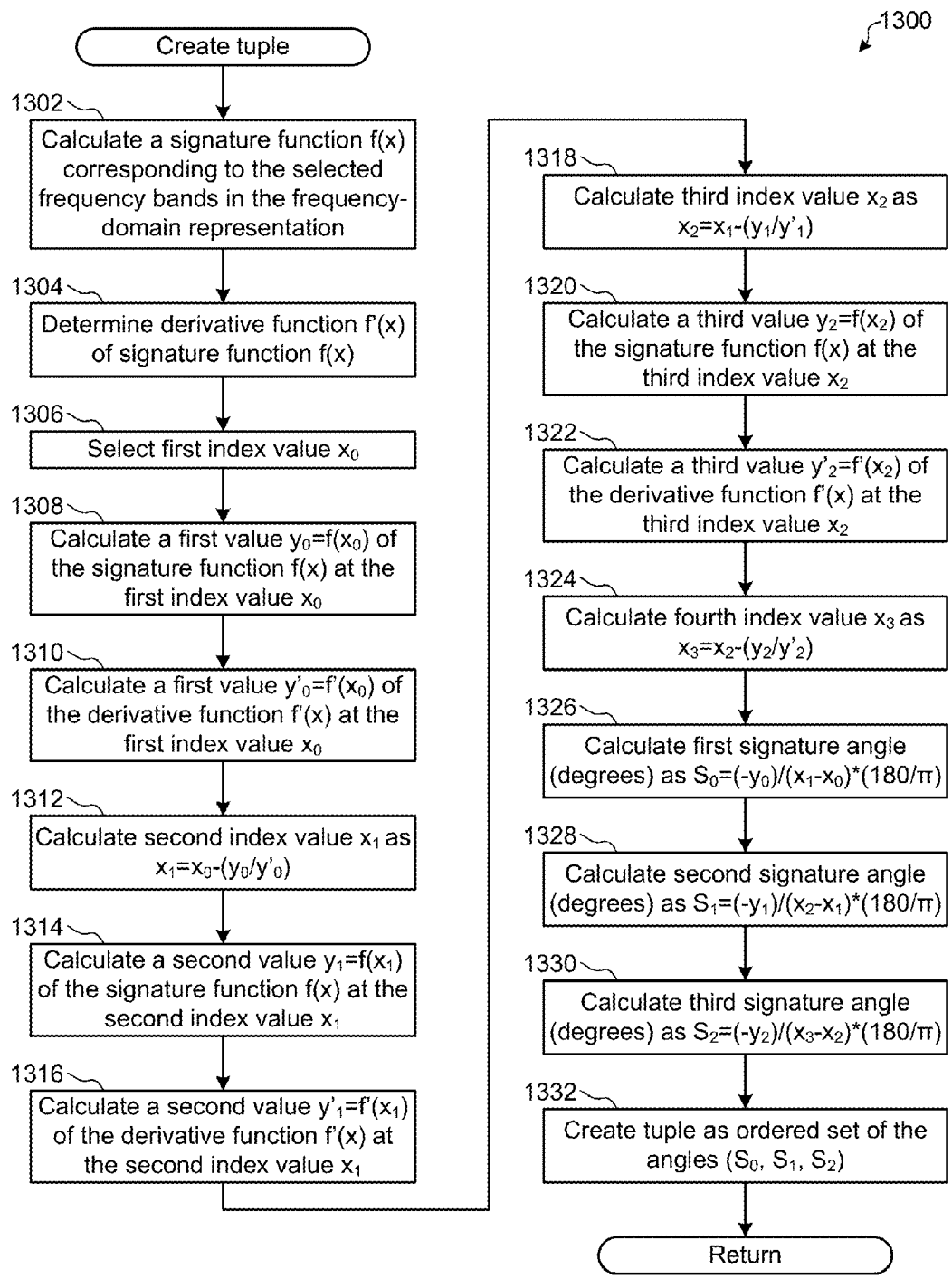
FIG. 13 is a flowchart representative of example computer readable instructions that may be executed to implement the example tuple generator of FIG. 2 to generate a tuple for a block of audio.

FIG. 13 is a flowchart representative of example computer readable instructions 1300 which may be executed to implement the example tuple generator 210 of FIG. 2 to generate a tuple for a block of audio. The example tuple generator 210 may perform the example instructions 1300 of FIG. 13 to implement block 1110 of FIG. 11. The example instructions 1300 of FIG. 13 are performed subsequent to the transformer 206 of FIG. 2 selecting a set of frequency bands (e.g., block 1108 of FIG. 11), and will be described below with reference to the example signature function 600 of FIG. 6.

The example curve fitter 208 of FIG. 2 calculates a signature function f(x) (e.g., the signature function 600 of FIG. 6) corresponding to the selected frequency bands in the frequency-domain representation of the media signal (block 1302). For example, the curve fitter 208 generates the signature function f(x) as a quadratic function (e.g., a second-order function). In other examples, other orders of functions may be used. Using an example notation of the signature function $f(x)=ax^2+bx+c$, the example curve fitter 208 of FIG. 2 determines the coefficients a, b, and c of the signature function. In some examples, the curve fitter 208 uses, for example, the least squares error technique to determine the coefficients (a, b, c) of the signature function f(x).

The example curve fitter 208 calculates a derivative function f'(x) of the signature function f(x) (block 1304). For example, the derivative function f'(x) is a linear function (e.g., $f'(x)=2ax+b$) when the example signature function f(x) is a quadratic function.

The example index selector 218 of FIG. 2 selects an initial index $x_0$ (e.g., the initial index 604 of FIG. 6) (block 1306). In some examples, the initial index $x_0$ is a standardized value, such as $x_0=1$, that is selected for the generation of every tuple in a signature. In some other examples, the index selector 218 calculates the initial index ($x_0$) using a formula that is based on one or more aspects of the signature function f(x). For example, the index selector 218 may select the initial index ($x_0$) to be a closest index value ($x_n$) to a maximum value of the signature function f(x) within the range in which the curve fitter 208 has defined the signature function f(x).

The example angle calculator 220 calculates a first value $y_0$ (e.g., the value 608 of FIG. 6) of the signature function f(x) at the initial index $x_0$ (e.g., $y_0=f(x_0)$) (block 1308). For example, the angle calculator 220 evaluates the value $y_0$ of the signature function f(x) at the initial index $x_0$.

The example angle calculator 220 calculates a first value $y'_0$ of the derivative function f'(x) (i.e., the slope of the first tangent line 606 of FIG. 6) at the initial index $x_0$ (e.g., $y'_0=f'(x_0)$) (block 1310). The first tangent line 606 is a line that has a value equal to the value of the signature function f(x) at the first index (e.g., $y_0=f(x_0)$) and that has a slope equal to the derivative function f'(x) at the first index e.g., $y'_0=f'(x_0)$).

The example index selector 218 calculates a second index value $x_1$ (e.g., the second index 610 of FIG. 6) as $x_1=x_0-(y_0/y'_0)=x_0-(f(x_0)/f'(x_0))$ (block 1312). For example, the second index value $x_1$ is the index value $x_n$ at which the first tangent line 606 is equal to zero. In the example of FIG. 2, the index selector 218 rounds the calculated second index $x_1$ to a nearest whole number.

The example angle calculator 220 calculates a second value $y_1$ (e.g., the value 614 of FIG. 6) of the signature function f(x) at the second index $x_1$ (e.g., $y_1=f(x_1)$) (block 1314). The example angle calculator 220 also calculates a value $y'_1$ of the derivative function f'(x) (i.e., the slope of the second tangent line 612 of FIG. 6 at the second index $x_1$, $y'_1=f'(x_1)$) (block 1316). The second tangent line 612 is a line that has a value equal to the value of the signature function f(x) at the second index (e.g., $y_1=f(x_1)$) and that has a slope equal to the derivative function f'(x) at the second index e.g., $y'_1=f'(x_1)$).

In the example of FIG. 2, the example index selector 218 calculates a third index value $x_2$ (e.g., the third index 616 of FIG. 6) as $x_2=x_1-(y_1/y'_1)=x_1-(f(x_1)/f'(x_1))$ (block 1318). For example, the third index value $x_2$ is the index value $x_n$ at which the second tangent line 612 is equal to zero. In the example of FIG. 2, the index selector 218 rounds the calculated third index to a nearest whole number.

The example angle calculator 220 calculates a third value $y_2$ (e.g., the value 620 of FIG. 6) of the signature function f(x) at the third index $x_2$ (e.g., $y_2=f(x_2)$) (block 1320). The example angle calculator 220 also calculates a value $y'_2$ of the derivative function f'(x) (i.e., the slope of the third tangent line 618) at the third index $x_2$ (e.g., $y'_2=f'(x_2)$) (block 1322). The third tangent line 618 is a line that has a value equal to the value of the signature function f(x) at the third index (e.g., $y_2=f(x_2)$) and that has a slope equal to the derivative function f'(x) at the third index e.g., $y'_2=f'(x_2)$).

In the example of FIG. 2, the example index selector 218 calculates a fourth index value $x_3$ (e.g., the fourth index 622 of FIG. 6) as $x_3=x_2-(y_2/y'_2)=x_2-(f(x_2)/f'(x_2))$ (block 1324). For example, the fourth index value $x_3$ is the index value $x_n$ at which the third tangent line 618 is equal to zero. In the example of FIG. 2, the index selector 218 rounds the calculated fourth index to a nearest whole number.

The example angle calculator 220 determines a first angle $S_0$ (e.g., the angle 624 of FIG. 6, in degrees) between the first tangent line 606 and a reference line (e.g., the reference line 626 of FIG. 6) as $S_0=(-y_0)/(x_1-x_0)*(180/\pi)$ (block 1326).

The example angle calculator 220 determines a second angle $S_1$ (e.g., the angle 628 of FIG. 6, in degrees) between the second tangent line 612 and the reference line 626 as $S_1=(-y_1)/(x_2-x_1)*(180/\pi)$ (block 1328).

The example angle calculator 220 determines a third angle $S_2$ (e.g., the angle 630 of FIG. 6, in degrees) between the third tangent line 618 and the reference line 626 as $S_2=(-y_2)/(x_3-x_2)*(180/\rho)$ (block 1330).

The example tuple generator 210 generates the tuple as an ordered set of the angles (e.g., [$S_0$, $S_1$, $S_2$]) (block 1332). The example instructions 1300 then end and return control to block 1112 of FIG. 11 to add the tuple (e.g., [$S_0$, $S_1$, $S_2$]) to an audio signature.

Figure 14A:
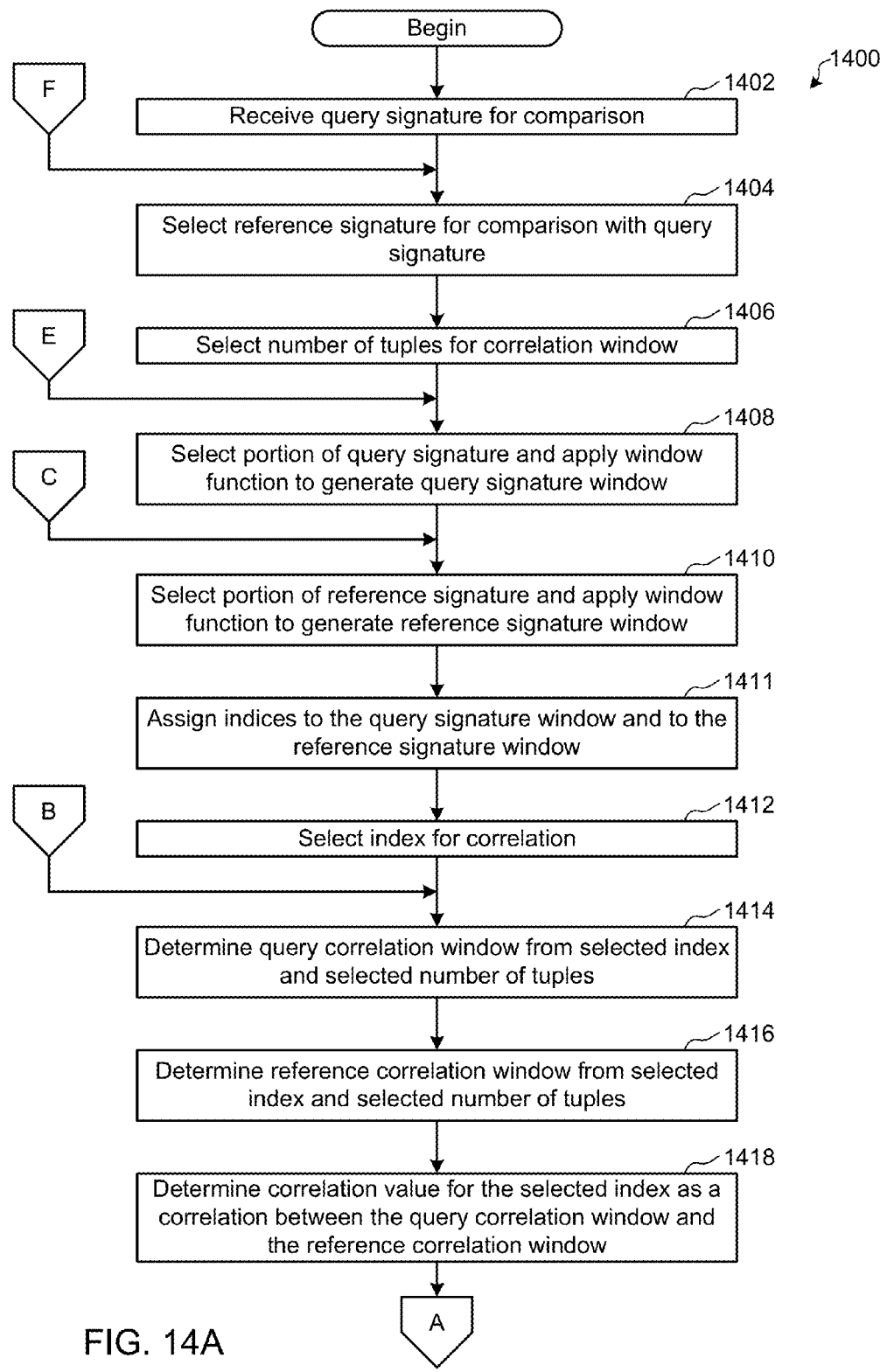
FIGS. 14A, 14B, and 14C collectively show a flowchart representative of example computer readable instructions that may be executed to implement the example signature analyzer of FIG. 1 and/or the example signature comparator of FIG. 3 to match an audio signature to a reference signature.
Figure 14B:
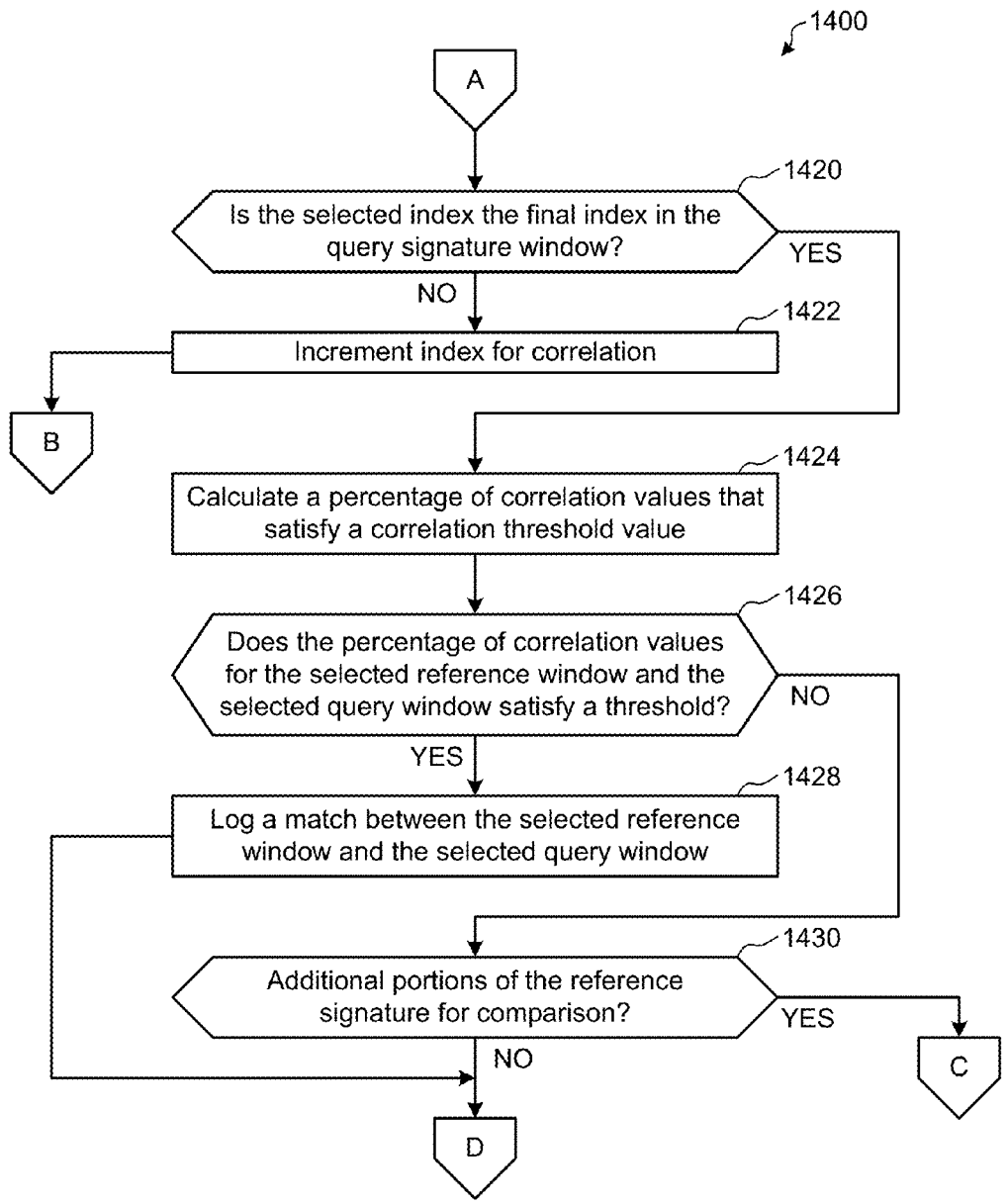
Figure 14C:
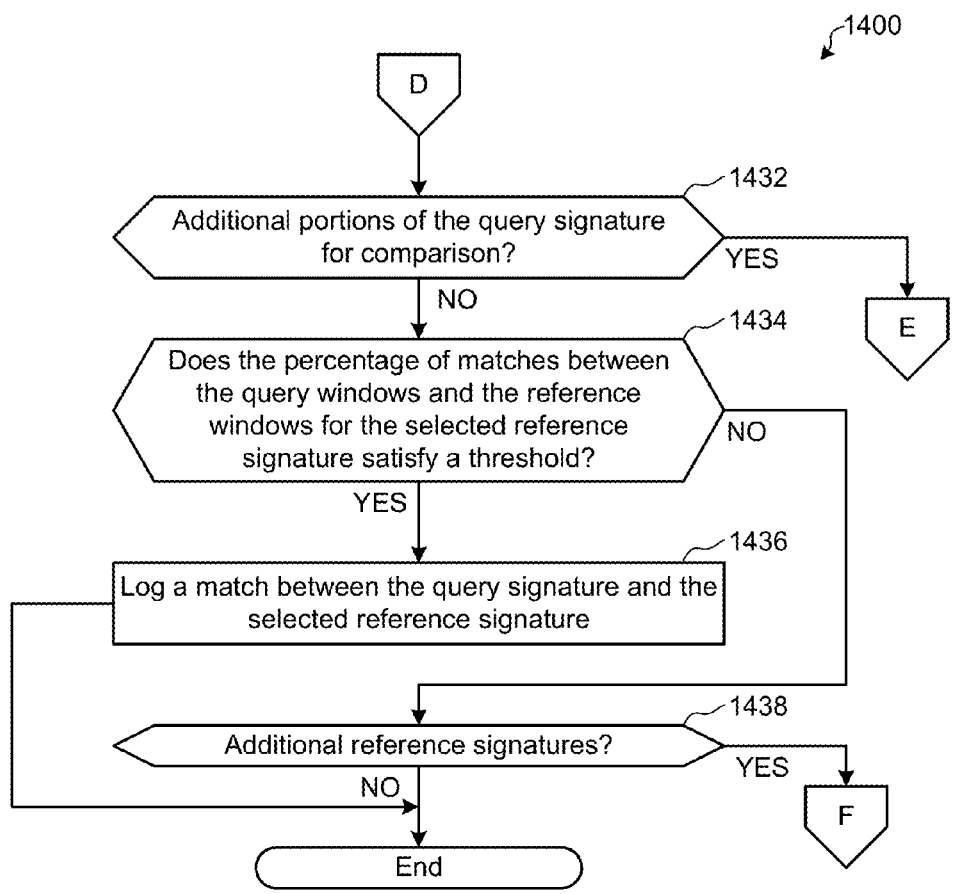

FIGS. 14A, 14B, and 14C collectively show a flowchart representative of example computer readable instructions 1400 which may be executed to implement the example signature analyzer 132 and/or the example signature comparator 300 of FIG. 3 to match a query signature to a reference signature. For example, the instructions 1400 may be used to identify query media, such as audio, by matching signatures of the query media to signatures of the reference media.

The example signature comparator 300 of FIG. 3 receives a query signature for comparison (block 1402). For example, the query signature windower 304 of FIG. 3 may receive a query signature from a signature generator such as the signature generator 114 of FIG. 1.

The example reference signature windower 302 of FIG. 3 selects a reference signature for comparison with the query signature (block 1404). For example, the reference signature windower 302 may query the reference signature database 312 of FIG. 3 based on one or more characteristics of the query signature to select a potential matching reference signature.

The example correlation calculator 306 of FIG. 3 selects a number of tuples for a correlation window (block 1406). For example, the correlation calculator 306 may use a same number of tuples for each correlation window and/or may vary a number of tuples based on one or more characteristics of the query signature and/or the reference signature.

The example query signature windower 304 of FIG. 3 selects a portion of the query signature and applies a window function to generate a query signature window (e.g., the query signature window 902 of FIG. 9) (block 1408). For example, the window function may include a number of tuples in the query signature and exclude the remainder of the tuples.

The example reference signature windower 302 of FIG. 3 selects a portion of the reference signature and applies the window function to generate a reference signature window (e.g., the reference signature window 904 of FIG. 9) (block 1410). For example, the reference signature windower 302 uses the same window used by the query signature windower 304 in block 1408 to generate a reference signature window 904 having the same number of tuples as the query signature window 902.

The example correlation calculator 306 assigns indices to the query signature window 902 and the reference signature window 904 (block 1411). For example, the correlation calculator 306 may assign sequential indices to corresponding ones of the tuples in the query signature window 902 and the reference signature window 904, such as index 1 to the first tuples in the query signature window 902 and the reference signature window 904, index 2 to the second tuples in the query signature window 902 and the reference signature window 904, and so on.

The example correlation calculator 306 of FIG. 3 selects an index for correlation (block 1412). For example, the correlation calculator 306 selects one of the indices assigned to the tuples in the query signature window 902 and the reference signature window 904.

The example correlation calculator 306 determines a query correlation window (e.g., the tuples of the query signature window 902 within the correlation window 906 of FIG. 9) from the selected index and the selected number of tuples (block 1414). For example, if the selected index (from block 1412) is '1' and the selected number of tuples (from block 1406) is 10, the example correlation calculator 306 determines the query correlation window to include 10 tuples (e.g., a sequential set of tuples) starting at an index based on index 1 (e.g., starting at index 1, starting at index 2, etc.). For example, the correlation calculator 306 may determine the query correlation window of FIG. 9 from an initial index (e.g., 1) and a selected number of tuples (e.g., 10 tuples). Similarly, the example correlation calculator 306 determines a reference correlation window (e.g., the tuples of the reference signature window 904 within the correlation window 906 of FIG. 9) from the selected index and the selected number of tuples (block 1416). For example, the reference correlation window may be determined in the same manner used to determine the query correlation window.

The example correlation calculator 306 determines a correlation value (e.g., a correlation value 1002 of FIG. 10) for the selected index as a correlation between the query correlation window and the reference correlation window (block 1418). For example, the correlation calculator 306 may determine a correlation coefficient (e.g., the Pearson product-moment correlation coefficient and/or any other type of correlation) between the set of tuples of the query correlation window and the set of tuples of the reference correlation window.

The example correlation calculator 306 determines whether the selected index is the final index in the query signature window (block 1420). For example, the correlation calculator 306 may determine whether correlation values can be calculated for additional indexes of the query signature window based on the selected number of tuples for the correlation window. If, for example, the selected number of tuples is 10, and correlation values have been calculated for indices 1 through 90 of query signature window having 100 tuples, the example correlation calculator 306 may determine that the selected index is the final index because the $91^{st}$ index does not have 10 tuples available from the query signature window to calculate the correlation value for the $91^{st}$ index (without including additional tuples from the query signature beyond those included in the query correlation window). If the selected index is not the final index in the query signature window (e.g., there are additional indices for which a correlation value can be calculated) (block 1420), the example correlation calculator 306 increments the index for correlation (block 1422) and returns control to block 1414 to determine another query correlation window.

When the selected index is the final index in the query signature window (block 1420), the example threshold comparator 308 of FIG. 3 calculates a percentage of the calculated correlation values that satisfy a correlation threshold value (block 1424). For example, the threshold comparator 308 compares each of the example correlation values calculated by the correlation calculator 306 (e.g., correlation values corresponding to the indices and/or corresponding to the correlation windows) to a correlation threshold (e.g. 0.7, or another appropriate value between −1.0 and +1.0, for Pearson product-moment correlation coefficients).

The example threshold comparator 308 determines whether the percentage of the correlation values that satisfy the threshold (block 1424) for the selected reference signature window and the selected query window satisfies a matching threshold (block 1426). The correlation threshold and/or the matching threshold may be selected to identify a match when the signal underlying the query signature is qualitatively the same as the reference signal underlying the reference signature. The correlation threshold and/or the matching threshold are also selected to reduce (e.g., avoid) false positives (e.g., to reduce the instances of indicating a match between two signals when the signals would not be recognized as the same by a human observer).

If the percentage of the correlation values for the selected reference signature window and the selected query window satisfies a matching threshold (block 1426), the example threshold comparator 308 logs a match between the selected reference window and the selected query window (block 1428). For example, the threshold comparator 308 may store an indication of the match in the signature match log 310 of FIG. 3.

If the percentage of the correlation values for the selected reference signature window and the selected query window does not satisfy a matching threshold (block 1426), the example reference signature windower 302 determines whether there are additional portions of the reference signature for comparison with the query signature (block 1430). If there are additional portions of the reference signature for comparison with the query signature (block 1430), the example reference signature windower 302 returns control to block 1410 to generate another reference signature window.

When there are no more portions of the reference signature for comparison with the query signature (block 1430), or after logging a match between the selected reference window and the selected query window (block 1428), the example query signature windower 304 of FIG. 3 determines whether there are additional portions of the query signature for comparison (block 1432). For example, if a query signature window is not matched to a reference signature window, the example query signature windower 304 may generate another query signature window that partially overlaps the non-matching query signature window. Conversely, if a query signature window is matched to a reference signature window, the example query signature windower 304 may generate another query signature window that has no overlapping samples with the matched query signature window.

If there are additional portions of the query signature for comparison (block 1432), the example query signature windower 304 to block 1408 to select another portion of the query signature.

When there are no more portions of the query signature for comparison (block 1432), the example threshold comparator 308 determines whether the percentage of matches between the query signature windows and the reference signature windows for the selected reference signature satisfy a threshold (block 1434). For example, the threshold comparator 308 may determine how much of the query signature (e.g., the non-overlapping percentage of the query signature) has been matched to the reference signature.

If the percentage of matches between the query signature windows and the reference signature windows for the selected reference signature satisfies the threshold (block 1434), the example threshold comparator 308 of FIG. 3 logs a match between the query signature and the selected reference signature (block 1436). For example, the threshold comparator 308 may store an indication in the signature match log 310 that the query signature matches the selected reference signature.

On the other hand, if the percentage of matches between the query signature windows and the reference signature windows for the selected reference signature does not satisfy the threshold (block 1434), the example reference signature windower 302 of FIG. 3 determines whether there are additional reference signatures that can be compared to the query signature to identify a match (block 1438). If there are additional reference signatures (e.g., reference signatures stored in the reference signature database 312 of FIG. 3) (block 1438), the example reference signature windower 302 transfers control to block 1404 to select another reference signature.

When there are no more reference signatures (block 1438), or after logging a match between the query signature and the selected reference signature (block 1436), the example instructions 1400 of FIGS. 14A-14C end. In some examples, the signature comparator 300 of FIG. 3 repeats the instructions 1400 for additional query signatures.

Figure 15:
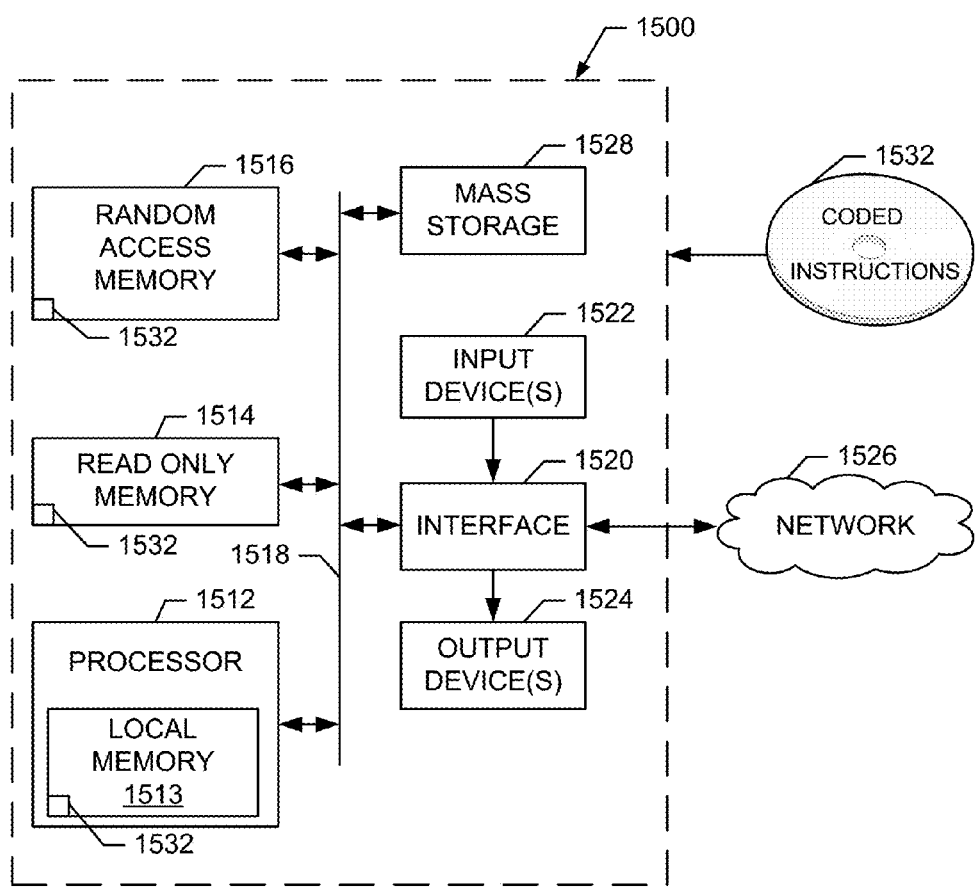
FIG. 15 is a block diagram of an example processor platform capable of executing the instructions of FIGS. 11, 12, 13, and/or 14A-14C to implement the apparatus of FIGS. 1, 2, and/or 3.

FIG. 15 is a block diagram of an example processor platform 1500 capable of executing the instructions of FIGS. 11, 12, 13, and/or 14A-14C to implement the example transducer 202, the example sampler 204, the example transformer 206, the example curve fitter 208, the example tuple generator 210, the example signature generator 212, the example polyphase quadrature filter 214, the example energy compactor 216, the example index selector 218, the example angle calculator 220, the example signature reducer 222, the example local cache 224, the example reference signature windower 302, the example query signature windower 304, the example correlation calculator 306, the example threshold comparator 308, the example signature match log 310, the example reference signature database 312 and/or, more generally, the example signature generator 200 of FIG. 2 and/or the example signature comparator 300 of FIG. 3. The processor platform 1500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIGS. 11, 12, 13, and/or 14A-14C may be stored in the mass storage device 1528, in the volatile memory 1514, in the non-volatile memory 1516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a correlation calculator to:
access a first set of values from a query signature based on a first index value, the first set of values determined based on a corresponding set of first angles between a first reference line and respective first lines tangent to first functions defined from first frequency band values determined for monitored audio;
access a second set of values from a reference signature based on the first index value, the second set of values determined based on a corresponding set of second angles between a second reference line and respective second lines tangent to second functions defined from second frequency band values determined for reference audio; and
compute a first correlation coefficient based on the first set of values and the second set of values; and
a threshold comparator to compare a set of correlation coefficients including the first correlation coefficient to a threshold to determine whether the query signature matches the reference signature.

2. The apparatus of claim 1, wherein the monitored audio is first monitored audio, and the correlation calculator is further to:
access a third set of values from the query signature based on a second index value, the third set of values determined based on a corresponding set of third angles between the first reference line and respective third lines tangent to third functions defined from third frequency band values determined for second monitored audio; and
access a fourth set of values from the reference signature based on the second index value, the fourth set of values determined based on a corresponding set of fourth angles between the second reference line and respective fourth lines tangent to fourth functions defined from fourth frequency band values determined for the reference audio, the correlation calculator to compute the first correlation coefficient further based on the third set of values and the fourth set of values, as well as the first set of values and the second set of values.

3. The apparatus of claim 2, wherein the second monitored audio partially overlaps the first monitored audio.

4. The apparatus of claim 2, further including:
a query signature windower to select a portion of the query signature as a query signature window; and
a reference signature windower to select a portion of the reference signature as a reference signature window, the correlation calculator to assign a set of indices to the portion of the query signature and the portion of the reference signature, the set of indices including the first index value and the second index value.

5. The apparatus of claim 1, wherein the threshold comparator is further to determine the query signature matches the reference signature when at least a threshold number of ones of the set of correlation coefficients satisfy the threshold.

6. The apparatus of claim 1, wherein the first set of values corresponds to a first tuple of the first angles and the second set of values corresponds to a second tuple of the second angles.

7. An audio signature comparison method comprising:
accessing, by executing an instruction with a processor, a first set of values from a query signature based on a first index value, the first set of values determined based on a corresponding set of first angles between a first reference line and respective first lines tangent to first functions defined from first frequency band values determined for monitored audio;
accessing, by executing an instruction with the processor, a second set of values from a reference signature based on the first index value, the second set of values determined based on a corresponding set of second angles between a second reference line and respective second lines tangent to second functions defined from second frequency band values determined for reference audio;
computing, by executing an instruction with the processor, a first correlation coefficient based on the first set of values and the second set of values; and
comparing, by executing an instruction with the processor, a set of correlation coefficients including the first correlation coefficient to a threshold to determine whether the query signature matches the reference signature.

8. The method of claim 7, wherein the monitored audio is first monitored audio, and further including:
accessing a third set of values from the query signature based on a second index value, the third set of values determined based on a corresponding set of third angles between the first reference line and respective third lines tangent to third functions defined from third frequency band values determined for second monitored audio; and
accessing a fourth set of values from the reference signature based on the second index value, the fourth set of values determined based on a corresponding set of fourth angles between the second reference line and respective fourth lines tangent to fourth functions defined from fourth frequency band values determined for the reference audio, the computing of the first correlation coefficient being further based on the third set of values and the fourth set of values, as well as the first set of values and the second set of values.

9. The method of claim 8, wherein the second monitored audio partially overlaps the first monitored audio.

10. The method of claim 8, further including:
selecting a portion of the query signature as a query signature window;
selecting a portion of the reference signature as a reference signature window; and
assigning a set of indices to the portion of the query signature and the portion of the reference signature, the set of indices including the first index value and the second index value.

11. The method of claim 7, wherein the comparing includes determining the query signature matches the reference signature when at least a threshold number of ones of the set of correlation coefficients satisfy the threshold.

12. The method of claim 7, wherein the first set of values corresponds to a first tuple of the first angles and the second set of values corresponds to a second tuple of the second angles.

13. The method of claim 7, further including, when the query signature is determined to match the reference signature, accessing a database using the reference signature to retrieve identification information for media associated with the monitored audio.

14. A tangible computer readable storage medium comprising computer readable instructions which, when executed, cause a processor to at least:
- access a first set of values from a query signature based on a first index value, the first set of values determined based on a corresponding set of first angles between a first reference line and respective first lines tangent to first functions defined from first frequency band values determined for monitored audio;
- access a second set of values from a reference signature based on the first index value, the second set of values determined based on a corresponding set of second angles between a second reference line and respective second lines tangent to second functions defined from second frequency band values determined for reference audio;
- compute a first correlation coefficient based on the first set of values and the second set of values; and
- compare a set of correlation coefficients including the first correlation coefficient to a threshold to determine whether the query signature matches the reference signature.

15. The storage medium of claim 14, wherein the monitored audio is first monitored audio, and the instructions, when executed, further cause the processor to:
- access a third set of values from the query signature based on a second index value, the third set of values determined based on a corresponding set of third angles between the first reference line and respective third lines tangent to third functions defined from third frequency band values determined for second monitored audio;
- access a fourth set of values from the reference signature based on the second index value, the fourth set of values determined based on a corresponding set of fourth angles between the second reference line and respective fourth lines tangent to fourth functions defined from fourth frequency band values determined for the reference audio; and
- compute the first correlation coefficient further based on the third set of values and the fourth set of values, as well as the first set of values and the second set of values.

16. The storage medium of claim 15, wherein the second monitored audio partially overlaps the first monitored audio.

17. The storage medium of claim 15, wherein the instructions, when executed, further cause the processor to:
- select a portion of the query signature as a query signature window;
- select a portion of the reference signature as a reference signature window; and
- assign a set of indices to the portion of the query signature and the portion of the reference signature, the set of indices including the first index value and the second index value.

18. The storage medium of claim 14, wherein the instructions, when executed, further cause the processor to determine the query signature matches the reference signature when at least a threshold number of ones of the set of correlation coefficients satisfy the threshold.

19. The storage medium of claim 14, wherein the first set of values corresponds to a first tuple of the first angles and the second set of values corresponds to a second tuple of the second angles.

20. The storage medium of claim 14, wherein the instructions, when executed, further cause the processor to access a database using the reference signature to retrieve identification information for media associated with the monitored audio when the query signature is determined to match the reference signature.

* * * * *